(12) United States Patent
Mashiko

(10) Patent No.: US 7,775,434 B2
(45) Date of Patent: Aug. 17, 2010

(54) BAR-CODE READING APPARATUS AND BAR-CODE READING METHOD

(75) Inventor: Tomomi Mashiko, Hachioji (JP)

(73) Assignee: Olympus Corporation, Tokyo (JP)

( * ) Notice: Subject to any disclaimer, the term of this patent is extended or adjusted under 35 U.S.C. 154(b) by 143 days.

(21) Appl. No.: 12/151,448

(22) Filed: May 7, 2008

(65) Prior Publication Data

US 2008/0277471 A1 Nov. 13, 2008

(30) Foreign Application Priority Data

May 11, 2007 (JP) ............................. 2007-126906

(51) Int. Cl.
*G06K 7/10* (2006.01)
*G06F 7/10* (2006.01)

(52) U.S. Cl. ...................... 235/462.01; 235/462.25; 235/462.26; 235/462.27; 235/462.28; 235/462.29

(58) Field of Classification Search ............ 235/462.01, 235/462.25–462.29
See application file for complete search history.

(56) References Cited

U.S. PATENT DOCUMENTS

2005/0274809 A1* 12/2005 Colley ................... 235/462.25

FOREIGN PATENT DOCUMENTS

| JP | 60-157678 A | 8/1985 |
| JP | 2001-028045 A | 1/2001 |

* cited by examiner

*Primary Examiner*—Michael G Lee
*Assistant Examiner*—Laura Gudorf
(74) *Attorney, Agent, or Firm*—Frishauf, Holtz, Goodman & Chick, P.C.

(57) ABSTRACT

A bar-code reading apparatus includes a differential processor which generates a differential signal from an electric signal corresponding to an intensity of light reflected from a bar code, an extreme value detector which detects each extreme value of the differential signal and generates extreme value information including at least an electric signal value of the detected extreme value, a voltage difference calculator which calculates a voltage difference in electric signal between a target extreme value and at least one of extreme values adjacent thereto for each extreme value in the extreme value information, and an extreme value verifying unit which compares the voltage difference with a predetermined threshold value and determines the validity of the extreme value corresponding to the voltage difference for each voltage difference. Information encoded as the bar code is decoded by using extreme value information of the valid extreme value.

18 Claims, 20 Drawing Sheets

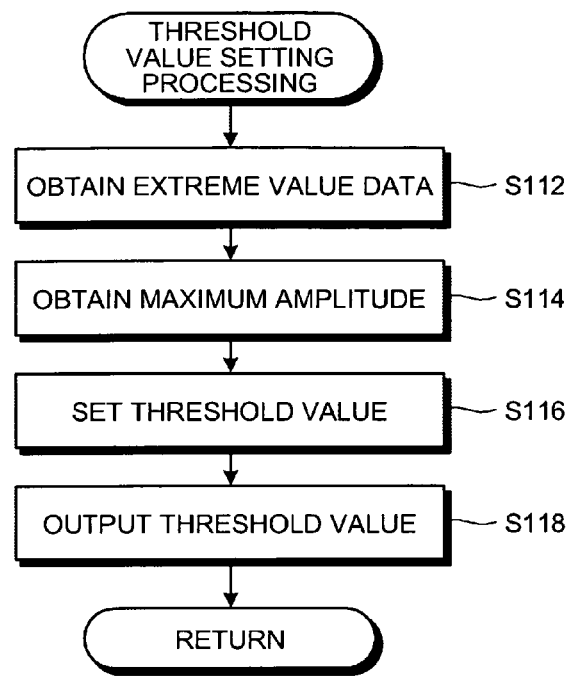
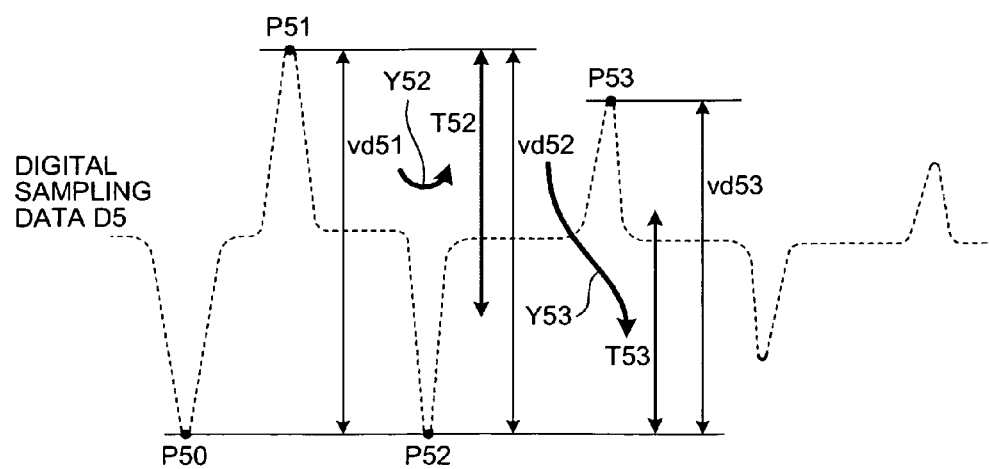

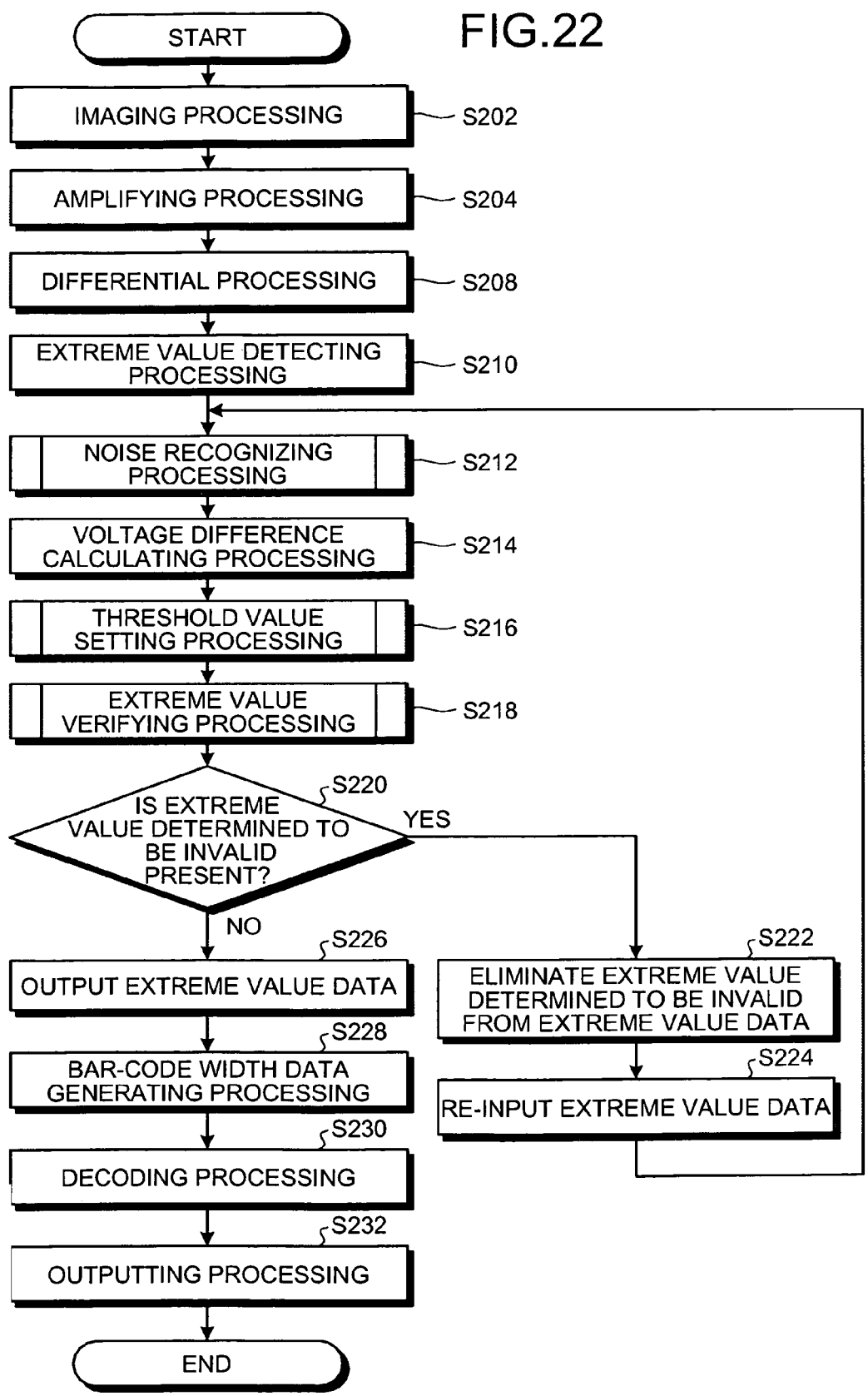

BAR-CODE READING APPARATUS AND BAR-CODE READING METHOD

CROSS-REFERENCE TO RELATED APPLICATIONS

This application is based upon and claims the benefit of priority from Japanese Patent Application No. 2007-126906, filed on May 11, 2007, the entire contents of which are incorporated herein by reference.

BACKGROUND OF THE INVENTION

1. Field of the Invention

The present invention relates to a bar-code reading apparatus and a bar-code reading method.

2. Description of the Related Art

A bar-code reading apparatus, which reads information encoded as a bar code through a scanning of the bar code with a laser beam and the like, has been widely used. Such a bar-code reading apparatus detects a change in optical characteristics of light reflected from the bar code and generates bar-code width data which shows a width of each element constituting the bar code. The bar-code reading apparatus then performs a decoding processing based on the bar-code width data, thereby reading the information encoded as the bar code.

Here, a bar-code reading processing which is generally executed in the bar-code reading apparatus will be explained. The bar-code reading apparatus uses a sensor to receive light reflected from the bar code, performs a current-to-voltage conversion (hereinafter, referred to as "I/V conversion") on a current signal corresponding to an amount of the received light, and generates an I/V conversion signal. The bar-code reading apparatus then performs a differential processing on the I/V conversion signal and obtains a differential signal. Next, the bar-code reading apparatus fixes, as a reference voltage value, a voltage value at a predetermined position of a signal-invariant region which does not include any extreme values in the differential signal, and processes the differential signal based on the reference voltage value to obtain a peak hold value as a voltage value at a peak and a bottom hold value. Then, the bar-code reading apparatus divides the voltage of the peak hold value and the bottom hold value which are calculated based on the reference voltage value by a predetermined ratio, and sets a threshold value signal which is to be a threshold value. After that, the bar-code reading apparatus compares the voltage value of the differential signal with the threshold value signal in sequence, and determines that the signal having a level not less than the threshold value signal should be the peak. Then, the bar-code reading apparatus generates a comparison signal based on a peak width of each peak, and regenerates the bar-code width data based on the comparison signal (see Japanese Patent Application Laid-Open No. S60-157678 and Japanese Patent Application Laid-Open No. 2001-28045).

SUMMARY OF THE INVENTION

A bar-code reading apparatus according to one aspect of the present invention includes a differential processor which generates a differential signal from an electric signal corresponding to an intensity of light reflected from a bar code; an extreme value detector which detects an extreme value in the differential signal generated by the differential processor, and generates extreme value information including at least an electric signal value of the detected extreme value; a calculating unit which calculates, for each extreme value in the extreme value information, a difference value between the electric signal value of the extreme value and an electric value of at least one of extreme values adjacent to the extreme value; a determining unit which compares the difference value with a predetermined threshold value and determines a validity of the extreme value corresponding to the difference value, for each difference value calculated by the calculating unit; and a decoding processor which uses the extreme value information of the extreme value which is determined to be valid by the determining unit to decode information encoded as the bar code.

A bar-code reading method in which a bar code is irradiated with light and read based on an intensity of the light reflected from the bar code, according to another aspect of the present invention includes generating a differential signal from an electric signal corresponding to the intensity of the light reflected from the bar code; generating, after detecting an extreme value in the differential signal, extreme value information including at least an electric signal value of the detected extreme value; calculating, for each extreme value in the extreme value information, a difference value between the electric signal value of the extreme value and an electric signal value of at least one of extreme values adjacent to the extreme value; determining a validity of the extreme value corresponding to the difference value, for each difference value calculated in the calculating by comparing the difference value with a predetermined threshold value; and decoding information encoded as the bar code by using the extreme value information of the extreme value which is determined to be valid in the determining.

BRIEF DESCRIPTION OF THE DRAWINGS

FIG. 14 is a flow chart of another procedure of the threshold value setting processing shown in FIG. 2;

FIG. 15 is an explanatory view of another example of the threshold value setting processing in the threshold value setting unit shown in FIG. 1;

FIG. 22 is a flow chart showing a procedure of a bar-code reading processing in the bar-code reading apparatus shown in FIG. 21.

DETAILED DESCRIPTION OF THE PREFERRED EMBODIMENTS

Exemplary embodiments of the present invention will be explained below with reference to the accompanying drawings. It should be noted that the invention is not limited by the embodiments, and that the identical part is assigned with the same symbol in the description throughout the drawings.

Figure 1:
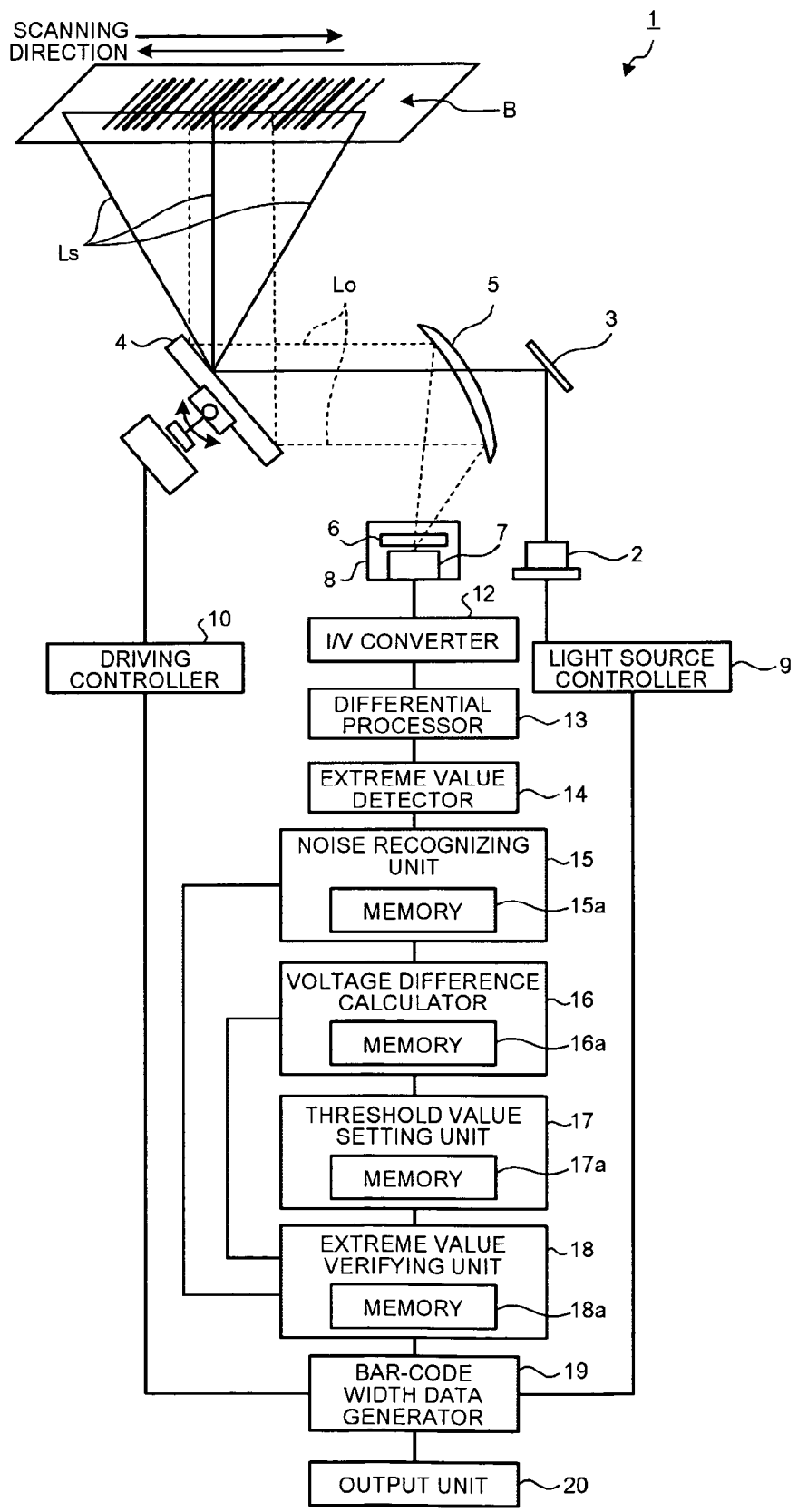
FIG. 1 is a view showing a structure of a bar-code reading apparatus according to an embodiment.

An embodiment will be explained first. FIG. 1 is a view showing a structure of a bar-code reading apparatus according to the embodiment. As shown in FIG. 1, a bar-code reading apparatus 1 according to the embodiment reads information encoded as a bar code B, in which each element is represented by a width according to encoded information.

The bar-code reading apparatus 1 includes a light source 2, a reflection mirror 3, a scanning mirror 4, a light collecting mirror 5, an optical filter 6, a sensor 7, a shield 8, a light source controller 9, a driving controller 10, an I/V converter 12, a differential processor 13, an extreme value detector 14, a noise recognizing unit 15, a voltage difference calculator 16, a threshold value setting unit 17, an extreme value verifying unit 18, a bar-code width data generator 19, and an output unit 20.

The light source 2 emits light such as a laser beam. The reflection mirror 3, which is fixed in place, reflects the light emitted from the light source 2 towards the scanning mirror 4. The scanning mirror 4 can be rotationally moved by a motor and the like, and causes light Ls reflected by the reflection mirror 3 to traverse on the bar code B along a lateral direction shown in FIG. 1. In addition, the scanning mirror 4 reflects light sequentially reflected from each region in the bar code B to the light collecting mirror 5. The light collecting mirror 5 collects light Lo reflected from the bar code B via the scanning mirror 4 onto the sensor 7. The optical filter 6, which is provided in front of the sensor 7, transmits only a wavelength necessary for reading a bar code.

The sensor 7 sequentially receives the light which is collected by the light collecting mirror 5 and then transmitted through the optical filter 6. Then, the sensor 7 generates a current signal corresponding to an intensity of the received light, and outputs this current signal to the I/V converter 12. The shield 8 has a function of eliminating an effect of an electromagnetic noise from the sensor 7. The light source controller 9 controls a light emitting processing in the light source 2 in association with a bar-code width data generating processing in the bar-code width data generator 19. The driving controller 10 controls a scanning processing in the scanning mirror 4 in association with the bar-code width data generating processing in the bar-code width data generator 19. In Other words, the driving controller 10 drives a motor in the scanning mirror 4 to control the rotational movement of the scanning mirror 4.

The I/V converter 12 converts the current signal output from the sensor 7 to a voltage signal and outputs the converted voltage signal to the differential processor 13. This voltage signal corresponds to the intensity of the light reflected from the bar code B. The I/V converter 12 may output the converted voltage signal after amplification.

The differential processor 13 performs a first-order differentiation on the voltage signal output from the I/V converter 12. The differential processor 13 thereby generates a differential signal in which an edge in rise or fall of the voltage value of the voltage signal is shown as an extreme value. The differential processor 13 may output the generated differential signal after amplification and filtering.

The extreme value detector 14 detects each extreme value showing each edge in rise or fall of the voltage value from the differential signal generated by the differential processor 13. The extreme value detector 14 outputs, to the noise recognizing unit 15, extreme value data shown in a state that time information corresponding to a light reception time in the sensor 7 is associated with an electric signal value (voltage value). The extreme value detector 14 generates digital sampling data which is generated as a result of an A/D conversion of the differential signal and detects an extreme value based on the digital sampling data. With respect to a first extreme value in the differential signal, the extreme value detector 14 recognizes an extreme value detected for the first time after a predetermined period of time during which no extreme value is detected as the first extreme value in the differential signal. With respect to a last extreme value in the differential signal, the extreme value detector 14, when no extreme value is detected for a predetermined period of time after a previous extreme value is detected, recognizes the previously detected extreme value as the last extreme value in the differential signal.

Among extreme values detected by the extreme value detector 14, the noise recognizing unit 15 recognizes an extreme value which is caused by a noise and the like and not corresponding to the bar code B. When successive rising extreme values are present in the extreme value data, the noise recognizing unit 15, for each rising extreme value, calculates a difference value between a voltage value of a target rising extreme value and a voltage value of a falling extreme value adjacent to the target rising extreme value. Then, the noise recognizing unit 15 recognizes that the rising extreme value corresponding to a maximum difference value among all difference values between successive rising extreme value and the falling extreme value adjacent to the successive rising extreme value should be a valid rising extreme value corresponding to the bar code B. When successive falling extreme values are present in the extreme value data, the noise recognizing unit 15, for each falling extreme value, calculates a difference value between a voltage value of a target falling extreme value and a voltage value of a rising extreme value adjacent to the target falling extreme value. Then, the noise recognizing unit 15 recognizes that the falling extreme value corresponding to a maximum difference value among all difference values between successive falling extreme value and the rising extreme value peak adjacent to the successive falling extreme value should be a valid falling extreme value corresponding to the bar code B. The noise recognizing unit 15 determines that an extreme value corresponding to a difference value other than the maximum difference value among all of the calculated difference values should be an invalid extreme value, and outputs extreme value data in which the invalid extreme value is eliminated to the voltage difference calculator 16. The noise recognizing unit 15 includes a memory 15a which can temporarily store at least the extreme value data input from the extreme value detector 14.

Based on the input extreme value data, the voltage difference calculator 16 calculates, for each extreme value, a difference value between a voltage value of a target extreme value and a voltage value of at least one of extreme values adjacent to the target extreme value. The voltage difference calculator 16 associates each piece of the calculated voltage difference data with time information and outputs the associated data to the extreme value detector 18. The voltage difference calculator 16 outputs each piece of the calculated voltage difference data to the threshold value setting unit 17. The voltage difference calculator 16 includes a memory 16a which can temporarily store at least the extreme value data input from the noise recognizing unit 15 and the calculated voltage difference data.

The threshold value setting unit 17 sets a threshold value to be used in a processing in the extreme value verifying unit 18. The threshold value setting unit 17 includes a memory 17a which can temporarily store at least the voltage difference data input from the voltage difference calculator 16 and store information of a processing for setting the threshold value.

The extreme value verifying unit 18 compares, for each voltage difference, a target voltage difference with a predetermined threshold value to determine the validity of an extreme value corresponding to the target voltage difference. When an absolute value of the target voltage difference is not less than the predetermined threshold value, the extreme value verifying unit 18 determines that the extreme value corresponding to the target voltage difference should be a valid extreme value corresponding to the bar code B. When the absolute value of the target voltage difference is less than the predetermined threshold value, the extreme value verifying unit 18 determines that the extreme value corresponding to the target voltage difference should be an invalid extreme value as not being corresponding to the bar code B, and eliminates the invalid extreme value from the extreme value data. The extreme value verifying unit 18 includes a memory 18a which can temporarily store at least the extreme value data, the voltage difference data input from the voltage difference calculator 16, and the threshold value set in the threshold value setting unit 17.

The bar-code width data generator 19 decodes the information encoded as the bar code B by using the extreme value which is determined to be valid by the extreme value verifying unit 18. Based on each extreme value output from the extreme value verifying unit 18, the bar-code width data generator 19 generates bar-code width data indicating each time width corresponding to each element width in the bar code B. Then, the bar-code width data generator 19 counts each time width in the bar-code width data, calculates each element width, and decodes the information encoded as the bar code B. The output unit 20 outputs the information of the bar code B decoded by the bar-code width data generator 19.

Figure 2:
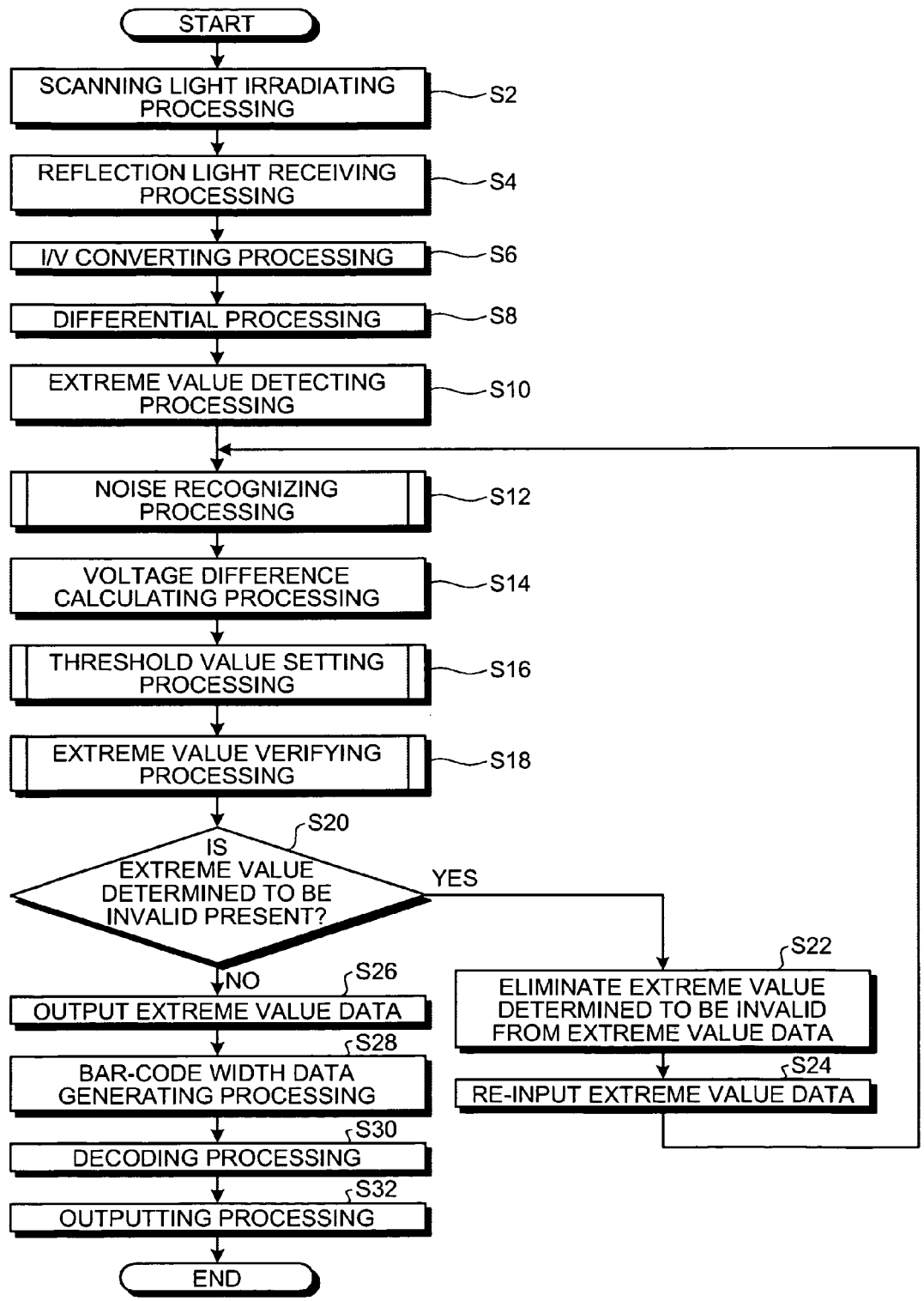
FIG. 2 is a flow chart of a procedure of a bar-code reading processing in the bar-code reading apparatus shown in FIG. 1.

A bar-code reading method in the bar-code reading apparatus 1 shown in FIG. 1 will be explained next. FIG. 2 is a flow chart of a procedure of a bar-code reading processing in the bar-code reading apparatus 1 shown in FIG. 1.

As shown in FIG. 2, the light source 2 and the scanning mirror 4 are driven to perform a scanning light emitting processing, in which the bar code B is emitted with a scanning light in a predetermined direction (step S2). Then, the sensor 7 performs a reflection light receiving processing, in which a reflection light is sequentially received and a current signal corresponding to the intensity of the received light is generated (step S4). The I/V converter 12 performs an I/V converting processing, in which the current signal output from the sensor 7 is converted into a voltage signal (step S6). The differential processor 13 performs a differential processing, in which the voltage signal output from the I/V converter 12 is differentiated to generate a differential signal (step S8).

Then, the extreme value detector 14 performs an extreme value detecting processing, in which extreme values are detected from the differential signal generated by the differential processor 13, extreme value data in which the voltage value and the time information in each extreme value are associated to each other is generated, and the extreme value data is output to the noise recognizing unit 15 (step S10).

Based on the input extreme value data, the noise recognizing unit 15 performs a noise recognizing processing, in which an extreme value corresponding to a noise and the like is recognized (step S12). When successive rising extreme values or successive falling extreme values are present, the noise recognizing unit 15 determines a valid rising extreme value or a falling extreme value from the successive rising extreme values or the successive falling extreme values. Then, the noise recognizing unit 15 outputs the extreme value data in which a rising extreme value or a falling extreme value determined to be invalid is eliminated to the voltage difference calculator 16.

Based on the input extreme value data, the voltage difference calculator 16 performs a voltage difference calculating processing, in which a voltage difference between a voltage value of a target extreme value and a voltage value of at least one of extreme values adjacent to the target extreme value is calculated for each extreme value to generate voltage difference data (step S14). Then, the threshold value setting unit 17 performs a threshold value setting processing, in which the threshold value to be used by the extreme value verifying unit 18 is set based on the voltage difference data generated in the voltage difference calculator 16 (step S16).

The extreme value verifying unit 18 performs an extreme value verifying processing, in which a voltage difference is compared with the predetermined threshold value for each voltage difference calculated by the voltage difference calculator 16 and whether each extreme value corresponding to each voltage difference is valid or invalid is determined (step S18). Then, the extreme value verifying unit 18 determines whether an extreme value which is determined to be invalid in the extreme value verifying processing (step S18) is present or not (step S20).

When it is determined that an extreme value determined to be invalid in the extreme value verifying processing is present ("Yes" at step S20), the extreme value verifying unit 18 eliminates the invalid extreme value form the extreme value data (step S22). Then, the extreme value verifying unit 18 re-inputs the extreme value data in which the invalid extreme value is eliminated to the noise recognizing unit 15 (step S24). The noise recognizing unit 15 performs the noise recognizing processing on the re-input extreme value data (step S12).

On the other hand, when it is determined that no extreme value determined to be invalid in the extreme value verifying processing is present ("No" at step S20), in other words, when it is determined that all extreme values shown in the extreme value data are valid, the extreme value verifying unit 18 outputs the extreme value data to the bar-code width data generator 19 (step S26). The bar-code width data generator 19 performs a bar-code width data generating processing, in which the bar-code width data corresponding to the bar code B is generated by using the extreme value data output from the extreme value verifying unit 18 (step S28). Then, the bar-code width data generator 19 performs a decoding processing, in which the information encoded as the bar code B is decoded by using the generated bar-code width data (step S30). The output unit 20 outputs the information of the bar code B decoded by the bar-code width data generator 19 (step S32).

Figure 3:
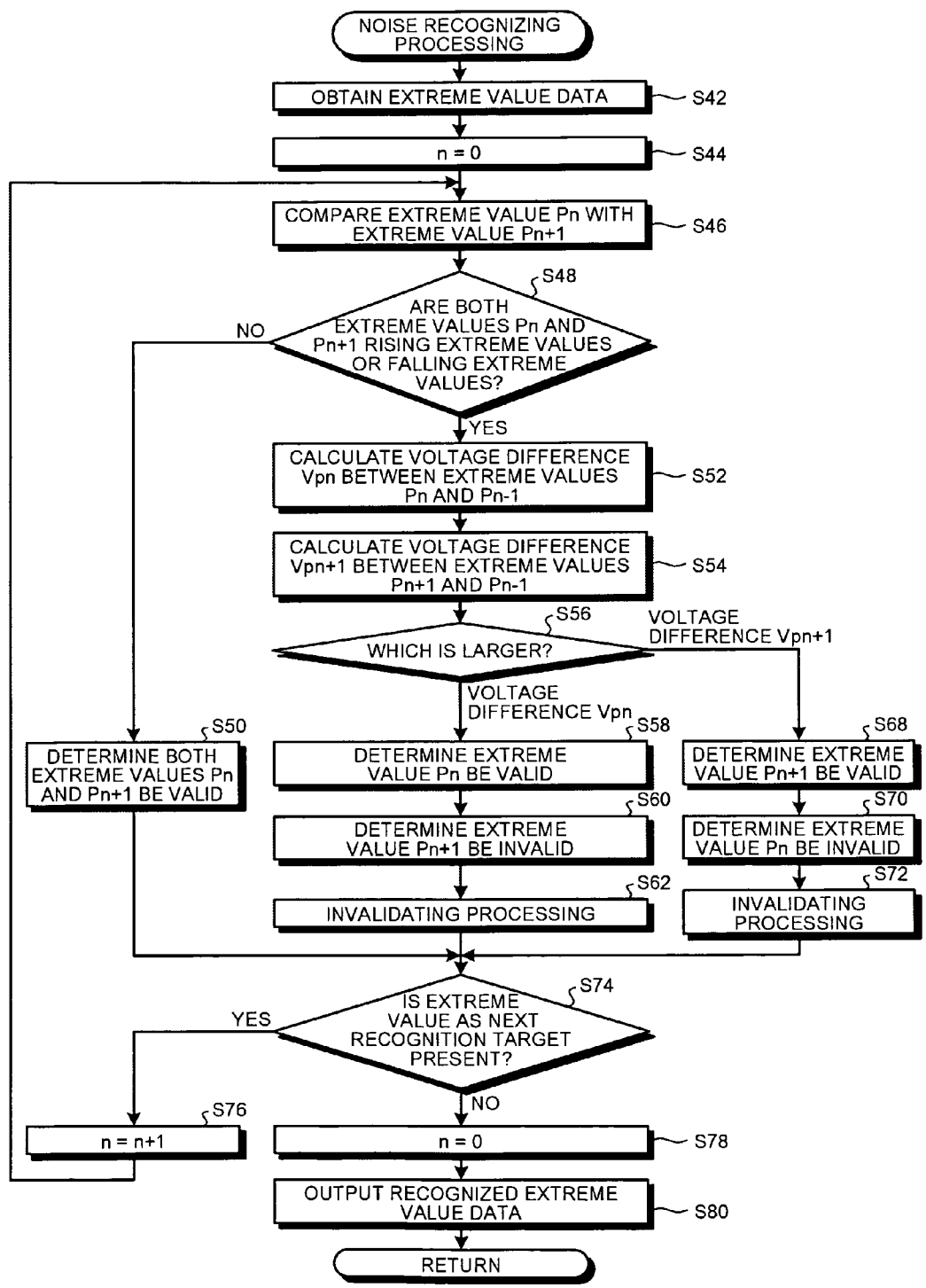
FIG. 3 is a flow chart of a procedure of a noise recognizing processing shown in FIG. 2.

The noise recognizing processing shown in FIG. 2 will be explained next with reference to FIG. 3. As shown in FIG. 3, the noise recognizing unit 15 first obtains the input extreme value data (step S42). The noise recognizing unit 15 determines whether a value n which indicates an identification number of an extreme value as a recognition target is initialized or not. When the value n is not initialized, the noise recognizing unit 15 initializes the value n. In this case, the noise recognizing unit 15 sets n=0 as an initialization processing on the identification number n when a first extreme value is P0 (step S44).

Next, the noise recognizing unit 15 compares an extreme value Pn as the recognition target with an extreme value Pn+1, which is present after the target extreme value Pn (step S46), and determines whether both of the extreme values Pn and Pn+1 are rising extreme values or not, or whether both of the extreme values Pn and Pn+1 are falling extreme values or not (step S48). When only light reflected from the bar code is properly received, a rising extreme value and a falling extreme value alternately appear in the differential signal. Therefore, when successive rising extreme values or successive falling extreme values are present, it is assumed that the differential signal includes an extreme value caused by a noise and the like. The noise recognizing unit 15 determines whether successive rising extreme values or successive falling extreme values are present or not, and verifies the presence of an extreme value caused by a noise and the like.

When it is determined that both of the extreme values Pn and Pn+1 are not rising extreme values or falling extreme values ("No" at step S48), the noise recognizing unit 15 determines that both of the extreme values Pn and Pn+1 should be valid (step S50).

On the other hand, when it is determined that both of the extreme values Pn and Pn+1 are rising extreme values or falling extreme values ("Yes" at step S48), the noise recognizing unit 15 determines which, the extreme value Pn or the extreme value Pn+1, is the extreme value caused by a noise and the like. A fluctuation of an optical signal caused by a noise and a dust is smaller than that of an optical signal at an edge of elements of the bar code. As shown in digital sampling data D21 in FIG. 4 for example, a rising extreme value P22 caused by a noise and the like has smaller fluctuation amount in signal from a falling extreme value P21, which is a falling extreme value before the extreme value P22, than a rising extreme value P23 essentially corresponding to the edge of elements of the bar code.

Consequently, to obtain a fluctuation amount of a signal value in each of the extreme values Pn and Pn+1, the noise recognizing unit 15 calculates a voltage difference Vpn between the extreme value Pn and an extreme value Pn−1 present before the extreme value Pn as the recognition target (step S52). Further, the noise recognizing unit 15 calculates a voltage difference Vpn+1 between the extreme value Pn+1 and the extreme value Pn−1 (step S54). Next, the noise recognizing unit 15 determines which, the voltage difference Vpn or the voltage difference Vpn+1, exhibits larger absolute value in voltage difference (step S56).

When it is determined that the voltage difference Vpn has larger absolute value in voltage difference ("voltage difference Vpn" at step S56), the noise recognizing unit 15 determines that the extreme value Pn should be valid (step S58). At the same time, the noise recognizing unit 15 determines that the extreme value Pn+1 should be invalid (step S60). Then, the noise recognizing unit 15 performs an invalidating processing in which the extreme value Pn+1 determined to be invalid is eliminated from the extreme value data (step S62).

In contrast, when it is determine that the voltage difference Vpn+1 has larger absolute value in voltage difference ("voltage difference Vpn+1" at step S56), the noise recognizing unit 15 determines that the extreme value Pn+1 should be valid (step S68). At the same time, the noise recognizing unit 15 determines that the extreme value Pn should be invalid (step S70). Then, the noise recognizing unit 15 performs an invalidating processing in which the extreme value Pn determined to be invalid is eliminated from the extreme value data (step S72).

Figure 4:
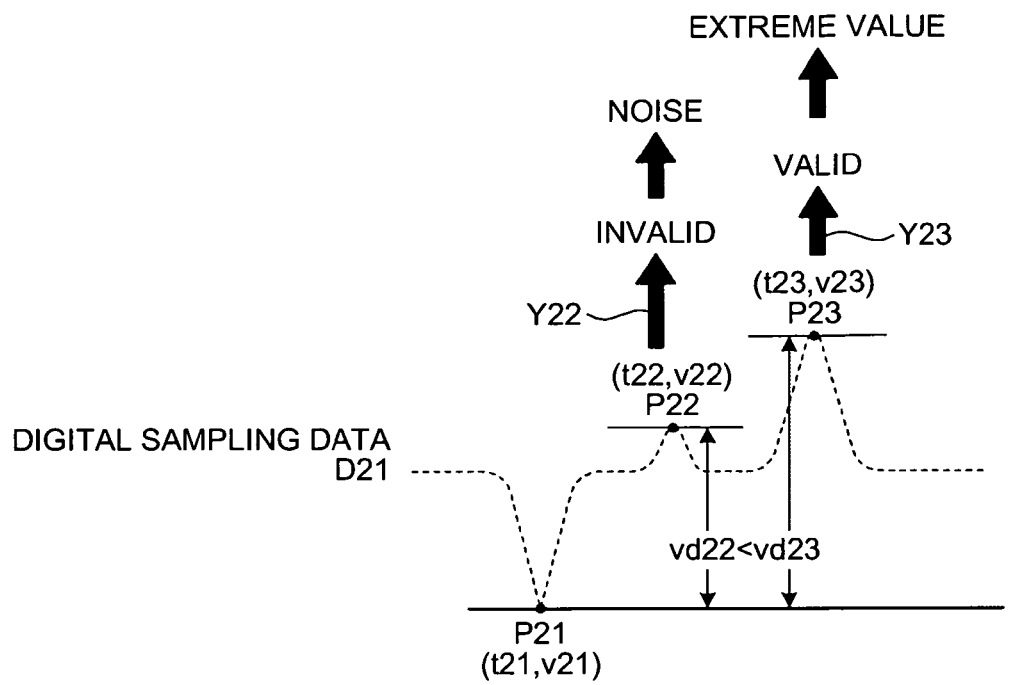
FIG. 4 is an explanatory view of the noise recognizing processing shown in FIG. 3.

In a case shown in FIG. 4 for example, in successive rising extreme values P22 and P23, a voltage difference vd23 between the rising extreme value P23 and a falling extreme value P21 is larger than a voltage difference vd22 between the rising extreme value P22 and the falling extreme value P21. Therefore, the noise recognizing unit 15 determines that the rising extreme value P23 having larger voltage difference should be valid in the successive rising extreme values P22 and P23 as shown by an arrow Y23, and recognizes the rising extreme value P23 as an extreme value corresponding to an edge portion of an element of the bar code. On the other hand, the noise recognizing unit 15 determines that the rising extreme value P22 having smaller voltage difference should be invalid in the successive rising extreme values P22 and P23 as shown by an arrow Y22, and recognizes the rising extreme value P22 as an extreme value which is caused by a noise and the like, and not corresponding to the bar code.

After performing the validity determining processing at step S50, the invalidating processing at step S62, or the invalidating processing at S72, the noise recognizing unit 15 determines whether an extreme value as a next recognition target is present or not (step S74). When it is determine that an extreme value as the next recognition target is present ("Yes" at step S74), the noise recognizing unit 15 performs a processing of setting n=n+1 with respect to the identification number n (step S76). The noise recognizing unit 15 goes to step S46 and performs a recognizing processing with respect to the extreme value as the next recognition target. When it is determined that no extreme value as the next recognition target is present ("No" at step S74), the noise recognizing unit 15 sets n=0 with respect to the identification number n (step S78), and outputs the recognized extreme value data (step S80). The recognized extreme value data does not include any extreme value which is determined to be invalid by the noise recognizing unit 15. In this way, the noise recognizing unit 15 eliminates an extreme value caused by a noise and the like when successive rising extreme values or successive falling extreme values are present.

Figure 5:
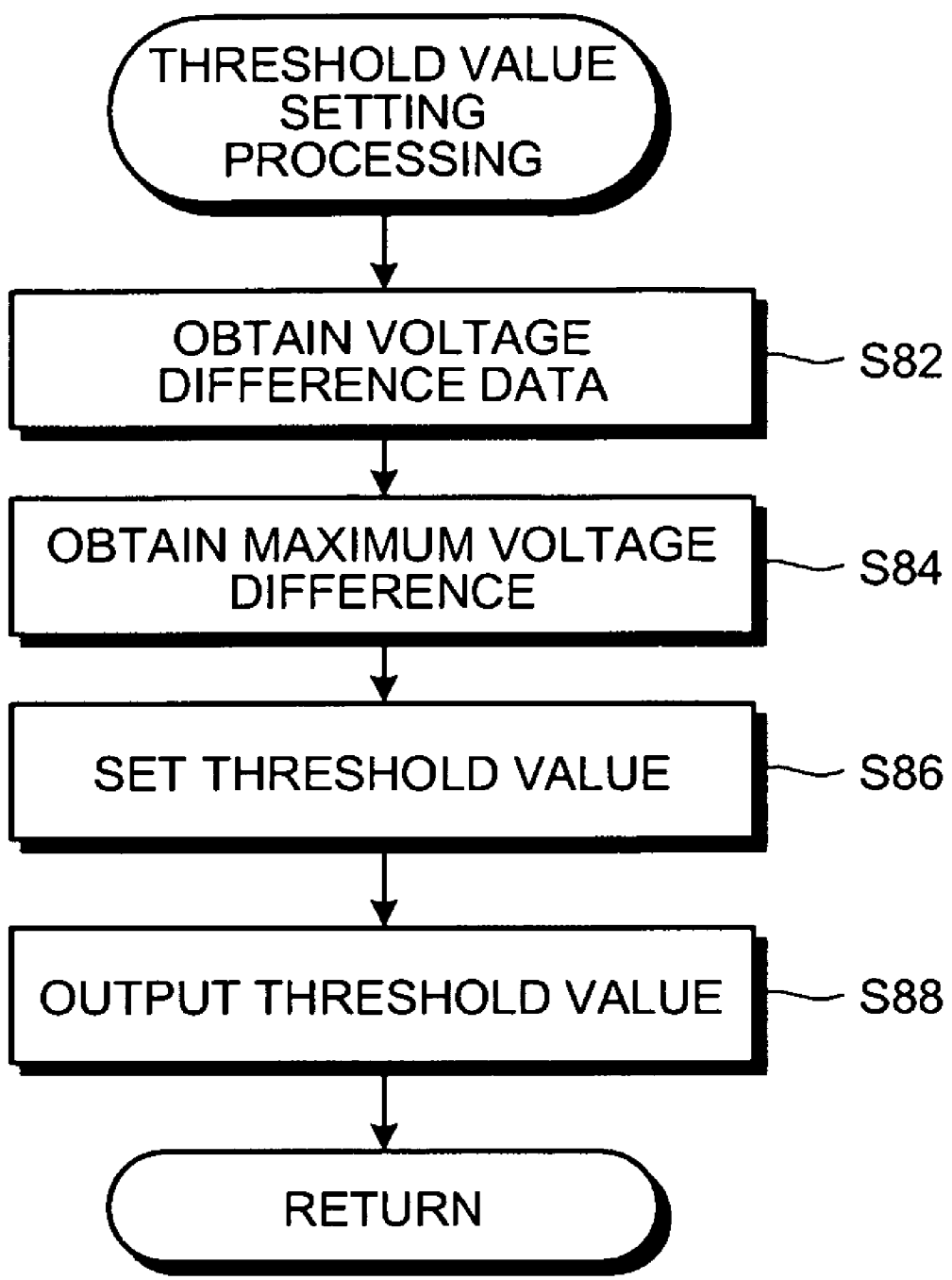
FIG. 5 is a flow chart of a procedure of a threshold value setting processing shown in FIG. 2.

Next, the threshold value setting processing shown in FIG. 2 will be explained with reference to FIG. 5. As shown in FIG. 5, the threshold value setting unit 17 obtains voltage difference data which is a target for setting a threshold value and includes voltage differences calculated by the voltage difference calculator 16 (step S82). Then, the threshold value setting unit 17 obtains a maximum voltage difference value in the voltage difference data (step S84). Based on the maximum voltage difference value, the threshold value setting unit 17 sets the threshold value (step S86). For example, the threshold value setting unit 17 sets a value which is 60% to 70% of the maximum voltage difference value as the threshold value, the value enabling a discrimination between an appropriate extreme value and an extreme value caused by a noise. Then, the threshold value setting unit 17 outputs the set threshold value to the extreme value verifying unit 18 (step S88).

Figure 6:
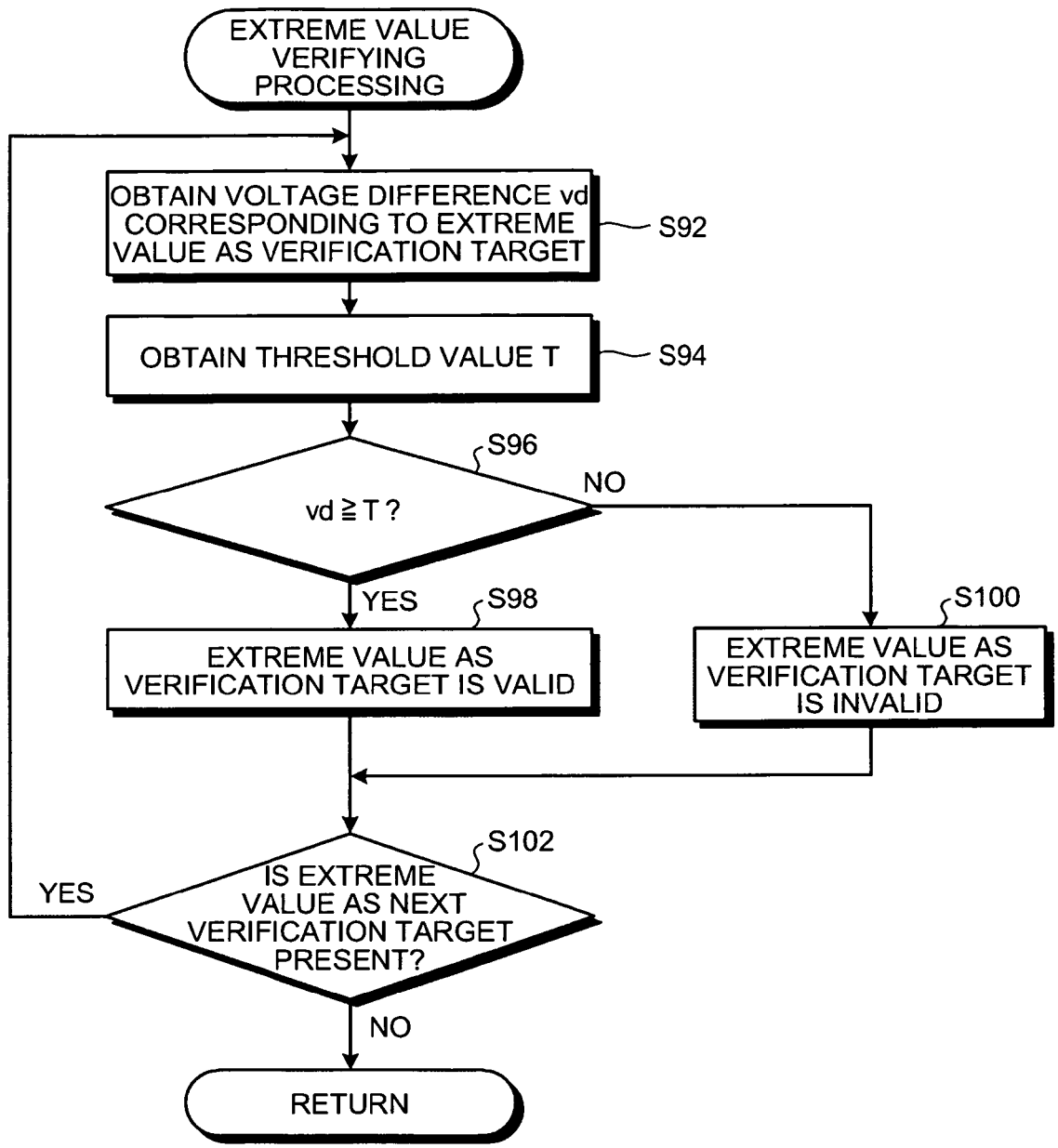
FIG. 6 is a flow chart of a procedure of an extreme value verifying processing shown in FIG. 2.

Next, the extreme value verifying processing shown in FIG. 2 will be explained with reference to FIG. 6. As shown in FIG. 6, the extreme value verifying unit 18 obtains a voltage difference vd corresponding to an extreme value as the verification target in the voltage difference data generated by the voltage difference calculator 16 (step S92). The extreme value verifying unit 18 then obtains a threshold value T corresponding to the target extreme value (step S94). In this case, the extreme value verifying unit 18 obtains the threshold value set by the threshold value setting unit 17. Then, the extreme value verifying unit 18 compares the voltage difference vd corresponding to the target extreme value with the threshold value T, and determines whether vd≧T is true or not (step S96).

When it is determined that vd≧T is true ("Yes" at step S96), the extreme value verifying unit 18 determines that the target extreme value corresponding to the voltage difference vd should be valid and corresponds to the bar code B (step S98). On the other hand, when it is determined that vd≧T is not true ("No" at step S96), in other words, when it is determined that vd<T is true, the extreme value verifying unit 18 determines that the target extreme value corresponding to the voltage difference vd is invalid and caused by a noise and the like (step S100).

Since the determination on the validity of the target extreme value is finished, the extreme value verifying unit 18 determines whether an extreme value as a next verification target is present or not (step S102). When it is determined that an extreme value as the next verification target is present ("Yes" at step S102), the extreme value verifying unit 18 returns to step S92 and performs the verifying processing on an extreme value as the next verification target. When it is determined that an extreme value as the next verification target is not present ("No" at step S102), the extreme value verifying processing 18 determines that the verification of all extreme values in the extreme value data is completed, and ends the extreme value verifying processing.

Figure 7:
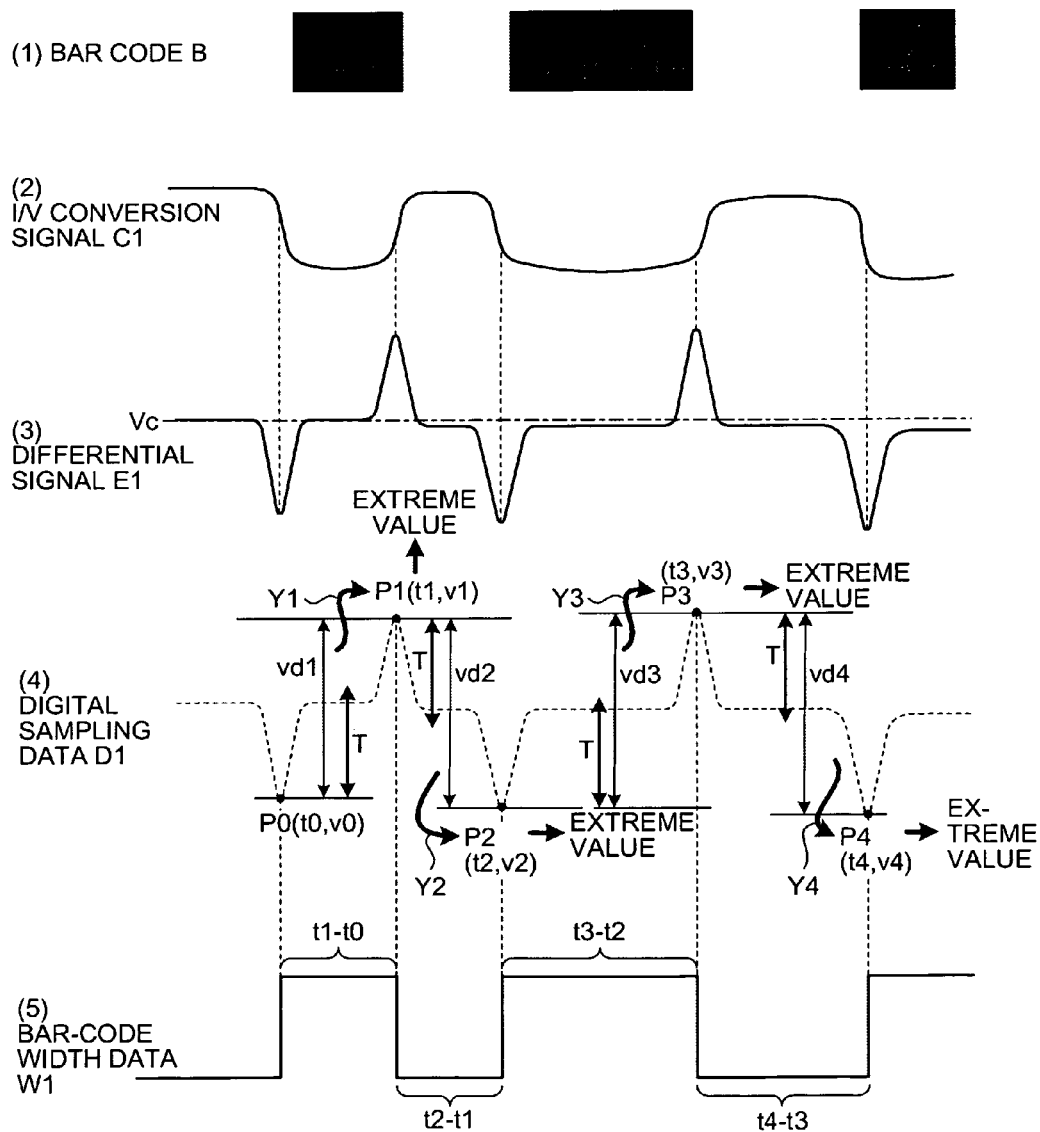
FIG. 7 is an explanatory view of the bar-code reading processing in the bar-code reading apparatus shown in FIG. 1.

Next, the extreme value verifying processing shown in FIG. 6 will be explained with reference to FIG. 7. In FIG. 7, (1) shows an arrangement example of elements of the bar code B, (2) shows an I/V conversion signal C1 corresponding to the light reflected from the bar code B, (3) shows a differential signal E1 which is generated as a result of a first-order differentiation of the I/V conversion signal C1, (4) shows digital sampling data D1 which is generated via the A/D conversion of the differential signal E1, and (5) in shows bar-code width data W1 generated from the digital sampling data D1.

When verifying the validity of an extreme value P1 in (4) of FIG. 7, the extreme value verifying unit 18 compares a voltage difference vd1 between a voltage value of the extreme value P1 and a voltage value of an extreme value P0 with the threshold value T, and determines whether vd1≧T is true or not. In other words, the extreme value verifying unit 18 determines whether the voltage difference vd1 is less than the threshold value T or not.

Here, the threshold value T is a value which is 60% of the maximum voltage difference value in the voltage difference data generated by the voltage difference calculator 16. Though a reference voltage Vc in the signal-invariant region of the differential signal is included in a zone about 50% of a maximum amplitude of the differential signal away from each extreme value, there is a possibility that a low voltage value caused by a noise is not less than the zone because the range is small. Besides, in a zone where a reflection light amount is small depending on the scanning angle of the scanning mirror 4, there is a possibility that the extreme value corresponding to the bar code B is less than a zone about 80% of the maximum amplitude of the differential signal away from each extreme value. Therefore, it is preferable to set the threshold value to a value which is approximately 60% to 70% of the maximum voltage difference in the voltage difference data so that a proper extreme value and an extreme value caused by a noise can be discriminated.

Consequently, when the voltage difference between the voltage value of the extreme value as the verification target and the voltage value of the extreme value adjacent to the target extreme value is not less than the threshold value T, in other words, when the voltage difference is equal to or more than the threshold value T, the target extreme value can be determined to be valid as being corresponding to the bar code B. Then, when the voltage difference corresponding to the target extreme value is less than the threshold value T, in other words, when the voltage difference is under the threshold value T, the target extreme value can be determined to be invalid as being caused by a noise and the like, and not corresponding to the bar code B.

Therefore, as shown in (4) in FIG. 7, the extreme value verifying unit 18 determines that the extreme value P1 should be a valid extreme value corresponding to the bar code B as shown by an arrow Y1 since the voltage difference vd1 is not less than the threshold value T. The extreme value verifying unit 18 also determines that an extreme value P2 should be a valid extreme value as shown by an arrow Y2 since a voltage difference vd2 which is a difference between a voltage value of the extreme value P2 and the voltage value of the extreme value P1 is not less than the threshold value T. Similarly, the extreme value verifying unit 18 determines that an extreme value P3 should be a valid extreme value as shown by an arrow Y3 since a voltage difference vd3 is not less than the threshold value T. Still similarly, the extreme value verifying unit 18 determines that an extreme value P4 should be a valid value as shown by an arrow Y4 since a voltage difference vd4 is not less than the threshold value T.

In this way, the extreme value verifying unit 18 determines whether an extreme value as the verification target should be valid as being corresponding to the bar code B by determining whether the voltage difference between the extreme value as the verification target and an extreme value adjacent to the target extreme value is not less than the predetermined threshold value T. The bar-code width data generator 19 uses time information (t0, t1, t2, t3, and t4) respectively of extreme values P0 to p4 which are determined to be valid by the extreme value verifying unit 18 to generate the bar-code width data W1 shown in (5) in FIG. 7. The bar-code width data generator 19 counts each duration in the bar-code width data W1 and decodes the information encoded as the bar code B.

Figure 8:
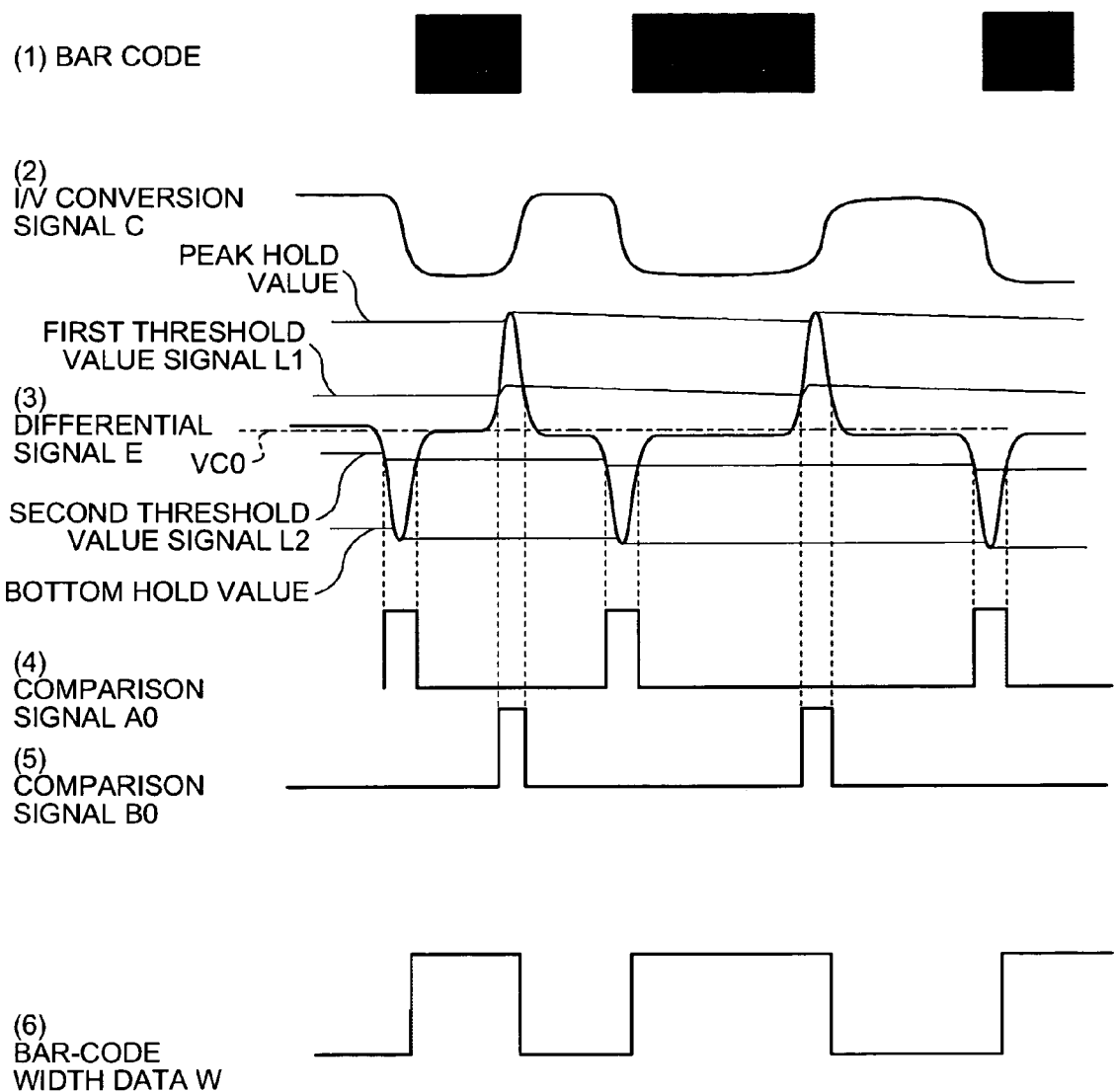
FIG. 8 is an explanatory view of a bar-code reading processing in a conventional bar-code reading apparatus.

The conventional bar-code reading apparatus fixes, as a reference voltage value, a voltage value at a predetermined position in the signal-invariant region of the differential signal. Then, the conventional bar-code reading apparatus calculates a peak hold value and a bottom hold value each of which is a voltage difference between the peak of the differential signal and the reference voltage value, sequentially divides the voltage of the calculated peak hold value and the bottom hold value by a predetermined ratio, and sets a threshold value signal for detecting a next peak. Specifically, the conventional bar-code reading apparatus receives the light reflected from a bar code illustrated in (1) of FIG. 8, performs the I/V conversion on a current signal corresponding to the received light amount, and generates an I/V conversion signal C illustrated in (2) of FIG. 8. Then, the conventional bar-code reading apparatus performs a differential processing on the I/V conversion signal C, and obtains a differential signal E illustrated in (3) of FIG. 8. Next, the conventional bar-code reading apparatus fixes a voltage value at a predetermined position in the signal-invariant region not including an extreme value in the differential signal E as a reference voltage value Vc0. The conventional bar-code reading apparatus processes the differential signal E based on the reference voltage value Vc0 and calculates the peak hold value and the bottom hold value which are peak voltage values. Next, the conventional bar-code reading apparatus divides the voltage of the peak hold value and the bottom hold value calculated on a basis of the reference voltage value Vc0 by a predetermined ratio, and sets a threshold value signal which is to be a threshold value. For example as illustrated in (3) of FIG. 8, a first threshold value signal L1 and a second threshold value signal L2 are set as the threshold value signal. The conventional bar-code reading apparatus compares a signal voltage value of the differential signal E and the threshold value signal in sequence, and determines that a signal having a level not less than the threshold value signal should be the peak. Then, the conventional bar-code reading apparatus generates comparison signals A0 and B0 respectively illustrated in (4) and (5) of FIG. 8 based on a peak width of each peak. After that, the conventional bar-code reading apparatus regenerates bar-code width data W based on the comparison signals A0 and B0 as shown in (4) of FIG. 8.

Figure 9:
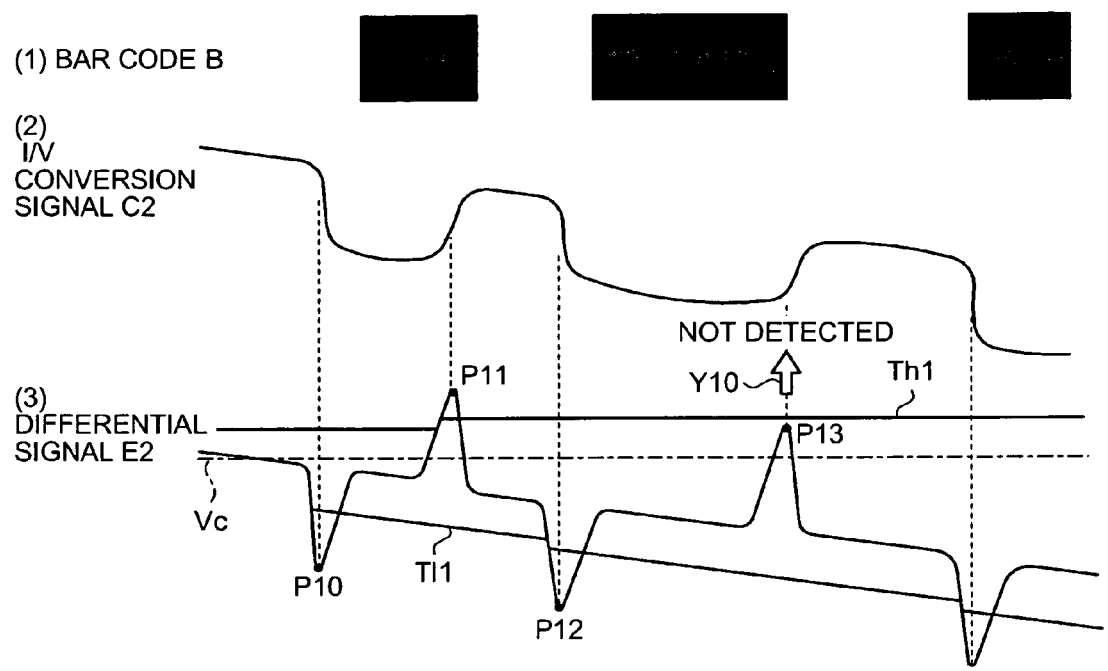
FIG. 9 is an explanatory view of another bar-code reading processing in the conventional bar-code reading apparatus.

When an outside light intervenes in the light reflected from the bar code B shown in (1) of FIG. 9 in the conventional bar-code reading apparatus, an I/V conversion signal C2 corresponding to the reflection light exhibits an undulation as shown in (2) of FIG. 9, for example. As a result, the I/V conversion signal C2 becomes a state that a right side region totally tilts in a direction of a smaller voltage value, for example. As shown in (3) of FIG. 9, a differential signal E2 as a result of a differential processing on the I/V conversion signal C2 also tilts in the right side due to the undulation. The conventional bar-code reading apparatus fixes and sets the reverence voltage Vc in accordance with a first signal-invariant region of the differential signal E2, regardless of the presence of the undulation. Therefore, when the signal undulates due to the outside light in the differential signal E2, there occurs a gap between the reference voltage Vc which is fixed and set based on the first signal-invariant region in the left side region and a voltage value of a signal-invariant region in the right side region tilting toward the right side. As a result of the gap, though a rising extreme value P13 in the right side region greatly deviated from the reference voltage Vc has substantially large voltage value between signal-invariant regions, the rising extreme value P13 is less than a threshold value signal Th1 set based on a rising extreme value P11 and the reference voltage Vc. Therefore, the conventional bar-code reading apparatus cannot detect the rising extreme value P13 as an extreme value as shown by an arrow Y10. Thus, there have been problems, in the conventional bar-code reading apparatus, that an accurate comparison signal cannot be generated when the outside light intervenes, and the bar code cannot be read accurately.

In contrast, the bar-code reading apparatus 1 according to the embodiment takes advantage of the fact that an extreme value itself appears in the differential signal regardless of the presence of the outside light, and determines the validity of an extreme value as a verification target based on a voltage difference with an extreme value adjacent to the target extreme value. In other words, the bar-code reading apparatus 1 is not configured to determine the validity of an extreme value based on the fixedly set reference voltage Vc. Therefore, the bar-code reading apparatus 1 can obtain a valid extreme value based on a voltage difference between extreme values even in the differential signal E2 greatly tilting in the right side as shown in FIG. 9.

Figure 10:
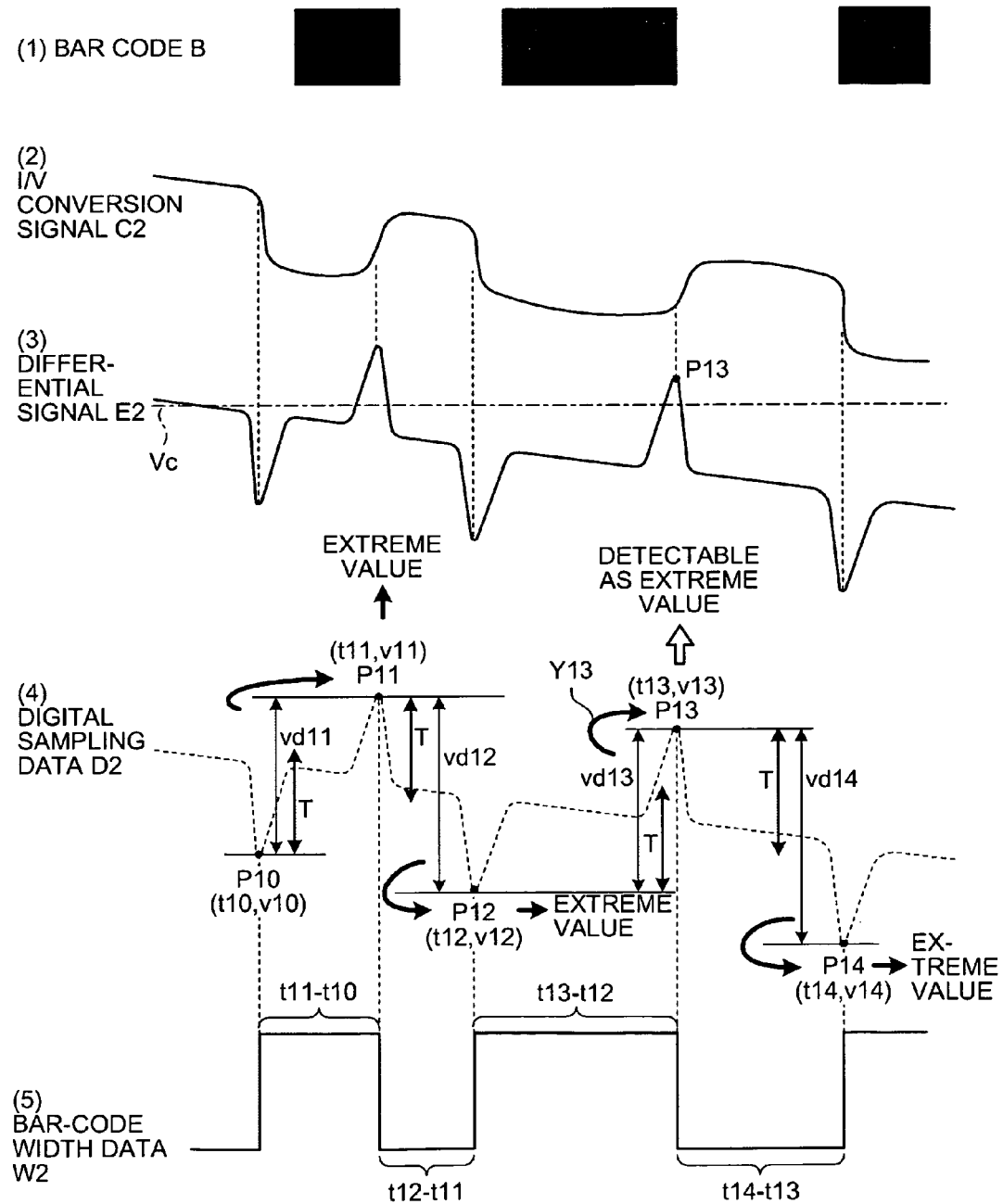
FIG. 10 is an explanatory view of the extreme value verifying processing shown in FIG. 6.

Specifically, the bar-code reading apparatus 1 determines that the extreme value P11 should be a valid extreme value since a voltage difference vd11 between the extreme value P11 and an extreme value P10 is not less than the threshold value T as shown in digital sampling data D2 in (4) of FIG. 10. The bar-code reading apparatus 1 determines that an extreme value P12 should be a valid extreme value since a voltage difference vd12 between the extreme value P12 and the extreme value P11 is not less than the threshold value T. Then, the bar-code reading apparatus 1 determines and detects that the extreme value P13, which cannot be detected as an extreme value as being less than the reference voltage Vc in the conventional technique, should also be an extreme value since a voltage difference vd13 between the extreme value P13 and the extreme value P12 is not less than the threshold value T as shown by an arrow Y13. By using the detected extreme value P13, the bar-code reading apparatus 1 determines that an extreme value P14, which is an extreme value next to the extreme value P13, should also be a valid extreme value since a voltage difference vd14 between the extreme value P14 and the extreme value P13 is not less than the threshold value T.

As a result of this, the bar-code reading apparatus 1 can accurately obtain the extreme values P11 to P14 even when the differential signal E2 undulates due to the intervention of the outside light. Thus, the bar-code reading apparatus 1 can generate bar-code width data W2 having a time width accurately corresponding to each element width of the bar code B by using time information t11 to t14 respectively of the extreme values P11 to P14, as shown in (5) of FIG. 10. Hence, the bar-code reading apparatus 1 can read the information encoded as the bar code B accurately.

Furthermore, the bar-code reading apparatus 1 according to the embodiment generates bar-code width data after eliminating an extreme value which is caused by a noise or a dust and not corresponding to each edge between elements of the bar code B in the noise recognizing unit 15 and the extreme value verifying unit 18. Therefore, the bar-code reading apparatus 1 can read the bar code B more accurately.

Figure 11:
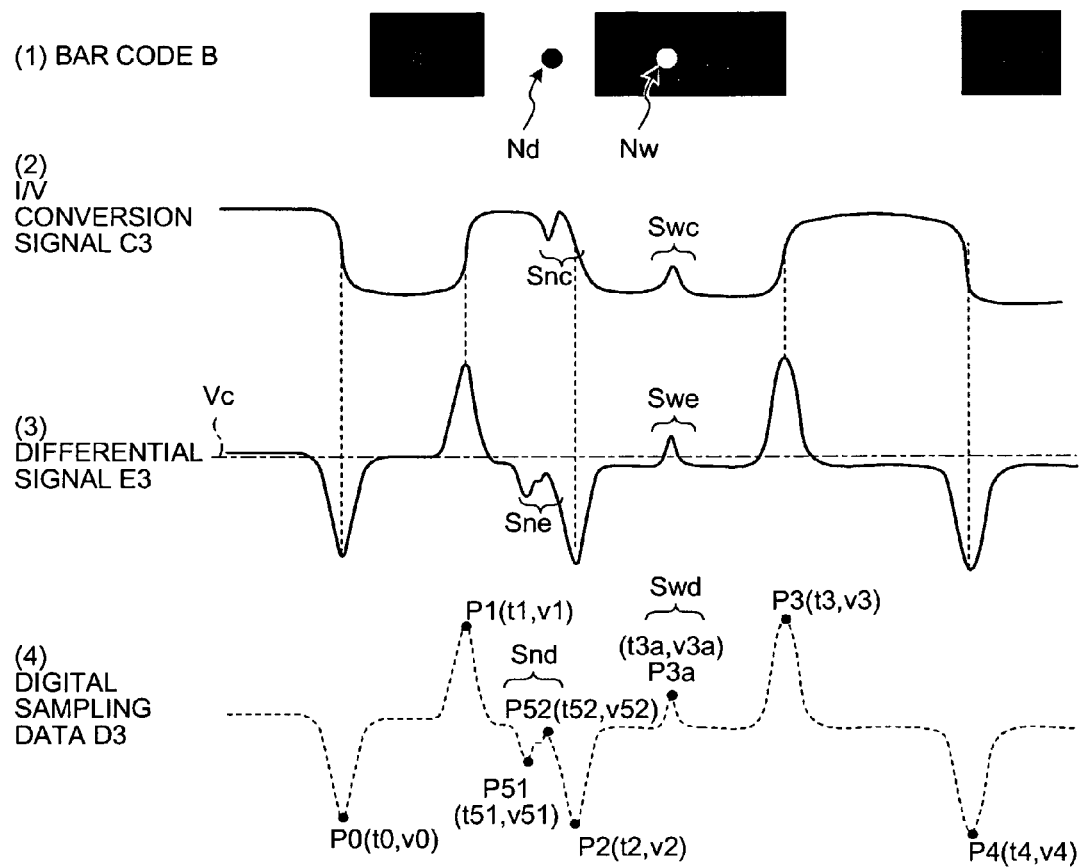
FIG. 11 is an explanatory view of a method of eliminating an extreme value in relation to a dust and a noise in the bar-code reading apparatus shown in FIG. 1.

A method of eliminating an extreme value caused by a dust and a noise in the bar-code reading apparatus 1 will be explained with reference to FIGS. 11 and 12. As shown in (1) of FIG. 11, when a dust Nd and a white dot Nw are present on the bar code B, a peak caused by the dust Nd appears in a region Snc and another peak caused by the white dot Nw appears in a region Swc in the I/V conversion signal C3 (see (2) of FIG. 11). As shown in (3) of FIG. 11, extreme values caused by the dust Nd appear in a region Sne and an extreme value caused by the white dot Nw stays in a region Swe even in a differential signal E3 as a result of the differential processing on the I/V conversion signal C3. As a result, in digital sampling data D3 which is generated based on the differential signal E3 and shown in (4) of FIG. 11, extreme values P51 and P52 caused by the dust Nd appear in a region Snd and an extreme value P3a caused by the white dot Nw appears in a region Swd together with appropriate extreme values P1 to P4 corresponding to edges of elements of the bar code B.

First, an elimination of the extreme value P3a caused by the white dot Nw will be explained. This extreme value P3a is eliminated in the noise recognizing processing (step S12) in the noise recognizing unit 15. Specifically, the noise recognizing unit 15, in the noise recognizing processing, calculates voltage differences between the falling extreme value P2 and each of the rising extreme values P3a and P3 which are successive in the input extreme value data, as shown in (1) of FIG. 12. In this case, a voltage difference vd3 corresponding to the rising extreme value P3 is larger than a voltage difference vd3a corresponding to the rising extreme value P3a. Therefore, the noise recognizing unit 15 determines that the rising extreme value P3a should be an invalid extreme value as being caused by a noise and the like, as shown by an arrow Y32, and that the rising extreme value P3 should be a valid extreme value as shown by an arrow Y31. Then, the noise recognizing unit 15 eliminates the rising extreme value P3a which is determined to be invalid from the extreme value data in the noise recognizing processing. As a result of this, the rising extreme value P3a caused by the white dot Nw in the region Swd is eliminated as shown in digital sampling data D31 in (2) of FIG. 12. In this manner, an invalid extreme value is eliminated in the noise recognizing processing in each of the cases where successive rising extreme values are present and where successive falling extreme values are present.

Here, the falling extreme value P51 and the rising extreme value P52 caused by the dust Nd in the region Snd are not eliminated in the noise recognizing processing since the falling extreme value P51 and the rising extreme value P52 are not successive rising extreme values or successive falling extreme values. The rising extreme value P52 is eliminated in the extreme value verifying processing (step S18) performed by the extreme value verifying unit 18.

Figure 12:
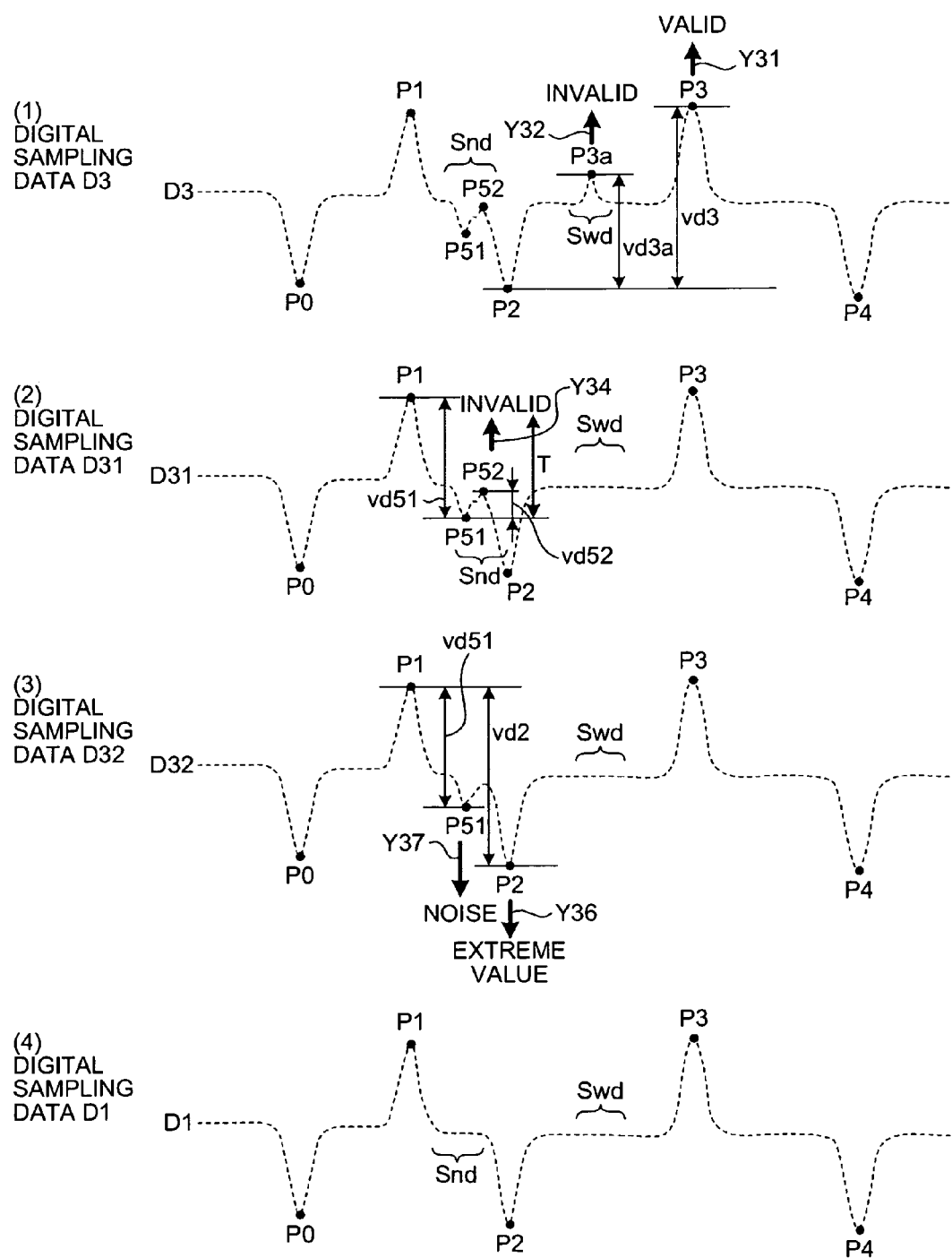
FIG. 12 is a further explanatory view of the method of eliminating an extreme value in relation to a dust and a noise in the bar-code reading apparatus shown in FIG. 1.

Specifically, the extreme value verifying unit 18 verifies the validity of the falling extreme value P51 in the extreme value verifying processing based on the input voltage difference data as shown in (2) of FIG. 12. In this case, since a voltage difference vd51 between the falling extreme value P51 and the rising extreme value P1 just before the falling extreme value P51 is not less than the threshold value T, the extreme value verifying unit 18 does not determine that the falling extreme value P51 should be invalid. Next, with respect to the rising extreme value P52, since a voltage difference vd52 between the rising extreme value P52 and the falling extreme value P51 just before the rising extreme value P52 is less than the threshold value T, the extreme value verifying unit 18 determines that the rising extreme value P52 should be invalid as shown by an arrow Y34. Then, the extreme value verifying unit 18 eliminates the rising extreme value P52 which is determined to be invalid from the extreme value data (step S22). Thus, as shown in digital sampling data D32 in (3) of FIG. 12, the rising extreme value P52 out of extreme values caused by the dust Nd in the region Snd is eliminated. Then, the extreme value verifying unit 18 re-inputs the extreme value data corresponding to the digital sampling data D31 where the falling extreme value P51 remains in the region Snd to the noise recognizing unit 15 (step S24). In this manner, when a falling extreme value and a rising extreme value appear alternately, at least one of invalid extreme values is eliminated in the extreme value verifying processing.

As a result of eliminating the rising extreme value P52 in the extreme value verifying processing, the falling extreme value P51 remaining in the region Snd comes to be adjacent to the falling extreme value P2. The falling extreme value P51 is eliminated in the noise recognizing processing (step S12) to be again performed by the noise recognizing unit 15. Specifically, the noise recognizing unit 15 calculates voltage differences between the rising extreme value P1 and each of successive falling extreme values P51 and P2 in the noise recognizing processing as shown in (3) of FIG. 12. In this case, a voltage difference vd2 corresponding to the falling extreme value P2 is larger than a voltage difference vd51 corresponding to the falling extreme value P51. Therefore, the noise recognizing unit 15 determines that the falling extreme value P51 should be an invalid extreme value as being caused by a noise and the like as shown by an arrow Y37, and that the falling extreme value P2 should be a valid extreme value as shown by an arrow Y36. Then, the noise recognizing unit 15 eliminates the falling extreme value P51 which is determined to be invalid from the extreme value data in the noise recognizing processing. As a result of this, the falling extreme value P51 caused by the dust Nd in the region Snd is eliminated as shown in digital sampling data D1 in (4) of FIG. 12. In this manner, an invalid extreme value is eliminated in the noise recognizing processing in each of the cases where successive rising extreme values are present and where successive falling extreme values are present.

As mentioned, even when an extreme value caused by a noise, a dust, and the like is present, the bar-code reading apparatus 1 can eliminate such an extreme value which is not corresponding to each edge of elements of the bar code B. Thus, the bar-code reading apparatus 1 can obtain the digital sampling data D1 which shows only the extreme values P1 to P4 accurately and respectively corresponding to edges of elements of the bar code B. Consequently, the bar-code reading apparatus 1 can generate bar-code width data which has a time width accurately corresponding to each element width of the bar code B by using the extreme values P1 to P4, and accurately read the information encoded as the bar code B.

In the embodiment, the case where the noise recognizing unit 15 determines the validity of successive two rising extreme values or falling extreme values in the noise recognizing processing (step S12) is explained. However, the noise recognizing unit 15 may determine the validity of successive more than two rising extreme values or successive more than two falling extreme values at one time. When the noise recognizing unit 15 determines the validity of successive more than two rising extreme values, the noise recognizing unit 15 calculates voltage differences between each of the successive more than two rising extreme values and a falling extreme value present before the successive more than two rising extreme values, and recognizes a rising extreme value corresponding to the voltage difference whose absolute value is maximum among the calculated voltage differences as a valid extreme value corresponding to the bar code. On the other hand, when the noise recognizing unit 15 determines the validity of successive more than two falling extreme values, the noise recognizing unit 15 calculates voltage differences between each of the successive more than two falling extreme values and a rising extreme value present before the successive more than two falling extreme values, and recognizes a falling extreme value corresponding to the voltage difference whose absolute value is maximum among the calculated voltage differences as a valid extreme value corresponding to the bar code.

In the embodiment, the case where the noise recognizing unit 15 recognizes a noise based on voltage differences between each of successive rising extreme values or successive falling extreme values as a recognition target and an extreme value present before the successive rising extreme values or the successive falling extreme values is explained. However, the present invention is not limited to this, and the noise recognizing unit 15 may recognize a noise based on voltage differences between each of successive rising extreme values or successive falling extreme values as a recognition target and an extreme value present after the successive rising extreme values or the successive falling extreme values.

Figure 13:
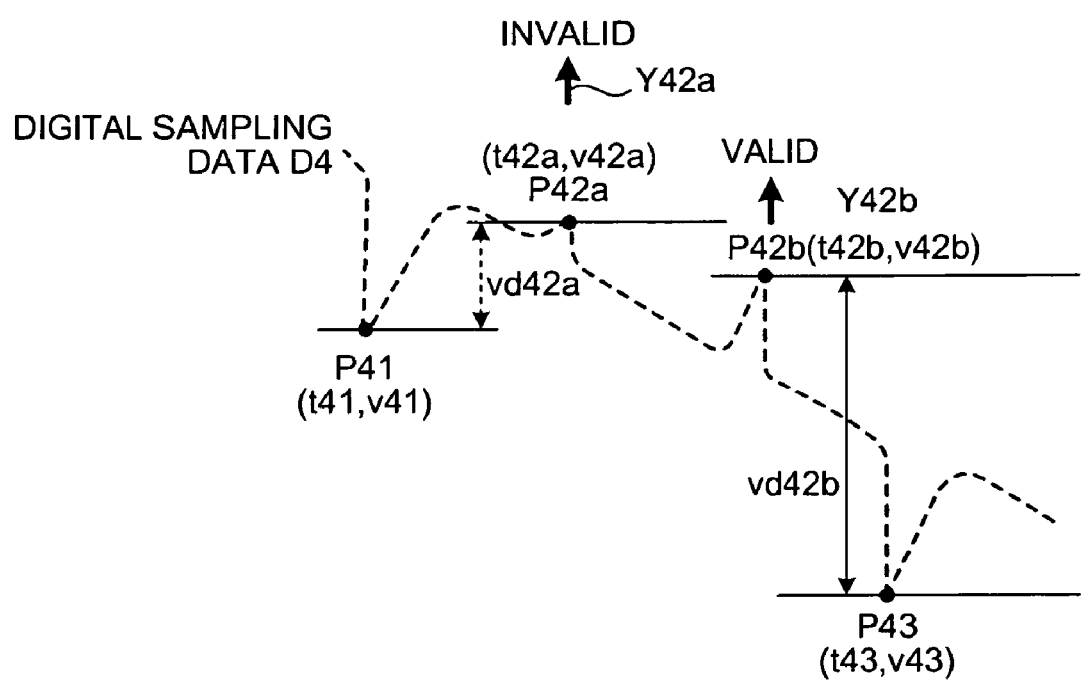
FIG. 13 is an explanatory view of another example of the noise recognizing processing in the noise recognizing unit shown in FIG. 1.

Furthermore, in addition to determining the validity of the successive rising extreme values or falling extreme values by calculating the voltage differences with the same extreme value, the noise recognizing unit 15 may determine the validity by calculating voltage differences with respectively different extreme values. By taking digital sampling data D4 shown in FIG. 13 as an example, the noise recognizing processing on successively present rising extreme values P42a and P42b will be explained. As shown in FIG. 13, with respect to the rising extreme value P42a, the noise recognizing unit 15 calculates a voltage difference vd42a between the rising extreme value P42a and a falling extreme value P41 which is most adjacent to the rising extreme value P42a and present just before the rising extreme value P42a. With respect to the rising extreme value P42b, the noise recognizing unit 15 calculates a voltage difference vd42b between the rising extreme value P42b and a falling extreme value P43 which is most adjacent to the rising extreme value P42b and present just after the rising extreme value P42b. Next, the noise recognizing unit 15 compares the calculated voltage difference vd42a with the calculated voltage difference vd42b. As a result of the comparison, the noise recognizing unit 15 determines that the rising extreme value P42b corresponding to the voltage difference vd42b whose absolute value is larger than that of the voltage difference vd42a should be valid as shown by an arrow Y42b, and that the rising extreme value P42a should be invalid as shown by an arrow Y42a. As shown in FIG. 13, when the entirety of the signal undulates and greatly tilts due to the intervention of the outside light, it is possible to make a time width between an extreme value as the recognition target and an extreme value with which the voltage difference is calculated small in the case where the determination is made based on voltage differences with a falling extreme value or a rising extreme value which is most adjacent to each of successive rising extreme values or falling extreme values as the recognition target, compared to the case where the determination is made based on voltage differences with the same extreme value adjacent to the successive rising extreme values or falling extreme values. Therefore, the noise recognizing unit 15 can recognize the validity of each extreme value in a state of reducing an influence of the tilt of the entirety of the signal. Furthermore, when successive rising extreme values or falling extreme values are detected, and voltage differences with two falling extreme values or two rising extreme values (falling extreme values P41 and P43 in FIG. 13, for example) which are adjacent to and have opposite polarity to the successive rising extreme values or falling extreme values are larger than a predetermined value, a processing of calculating a difference in potential with respectively different extreme values and determining the validity of a target extreme value as described above may be applied in the noise recognizing unit 15.

In the embodiment, the case where the threshold value setting unit 17 sets the threshold value for the extreme value verifying processing based on the rising extreme value in voltage difference in the voltage difference data including voltage differences calculated by the voltage difference calculator 16 as the threshold value setting processing is explained. However, the present invention is not limited to this, and the threshold value setting unit 17 may set, as the threshold value, a value input from an input unit (not shown), or may retrieve and set a threshold value as the threshold value.

The threshold value setting unit 17 may set the threshold value based on the extreme value data output from the noise recognizing unit 15 as the threshold value setting processing. In this case, the threshold value setting unit 17 obtains extreme value data which is a target for setting the threshold value from the noise recognizing unit 15 as shown in FIG. 14 (step S112). Next, the threshold value setting unit 17 obtains maximum amplitude in the differential signal based on the maximum voltage value and the minimum voltage value of extreme values in this extreme value data (step S114). Then, the threshold value setting unit 17 sets the threshold value based on the maximum amplitude (step S116). For example, the threshold value setting unit 17 sets a value which is 60% of the value of the maximum amplitude as the threshold value. The threshold value setting unit 17 outputs the set threshold value to the extreme value verifying unit 18 (step S118).

Besides, the threshold value setting unit 17 may set a threshold value for each extreme value as a target of the verification performed by the extreme value verifying unit 18 as the threshold value setting processing. In this case, the threshold value setting unit 17 sets a threshold value corresponding to a target extreme value based on a voltage difference value in an extreme value just before the target extreme value, for example. Specifically, in a case of digital sampling data D5 in FIG. 15, the threshold value setting unit 17 sets, with respect to an extreme value P52, based on a voltage difference vd51 between an extreme value P51 just before the target extreme value P52 and an extreme value P50 just before the extreme value P51 as shown by an arrow Y52. The threshold value T52 is, for example, a value which is 60% of the voltage difference vd51. The extreme value verifying unit 18 determines the validity of the extreme value P52 by comparing the voltage difference vd52 between the extreme value P52 and the extreme value P51 with the threshold value T52. Further, the threshold value setting unit 17 sets, with respect to an extreme value P53, a value which is 60% of the voltage difference vd52 between the extreme value P52 and the extreme value P51 as a threshold value T53. The extreme value verifying unit 18 determines the validity of the extreme value P53 by comparing the voltage difference vd53 between the extreme value P53 and the extreme value P52 with the threshold value T53.

Figure 16:
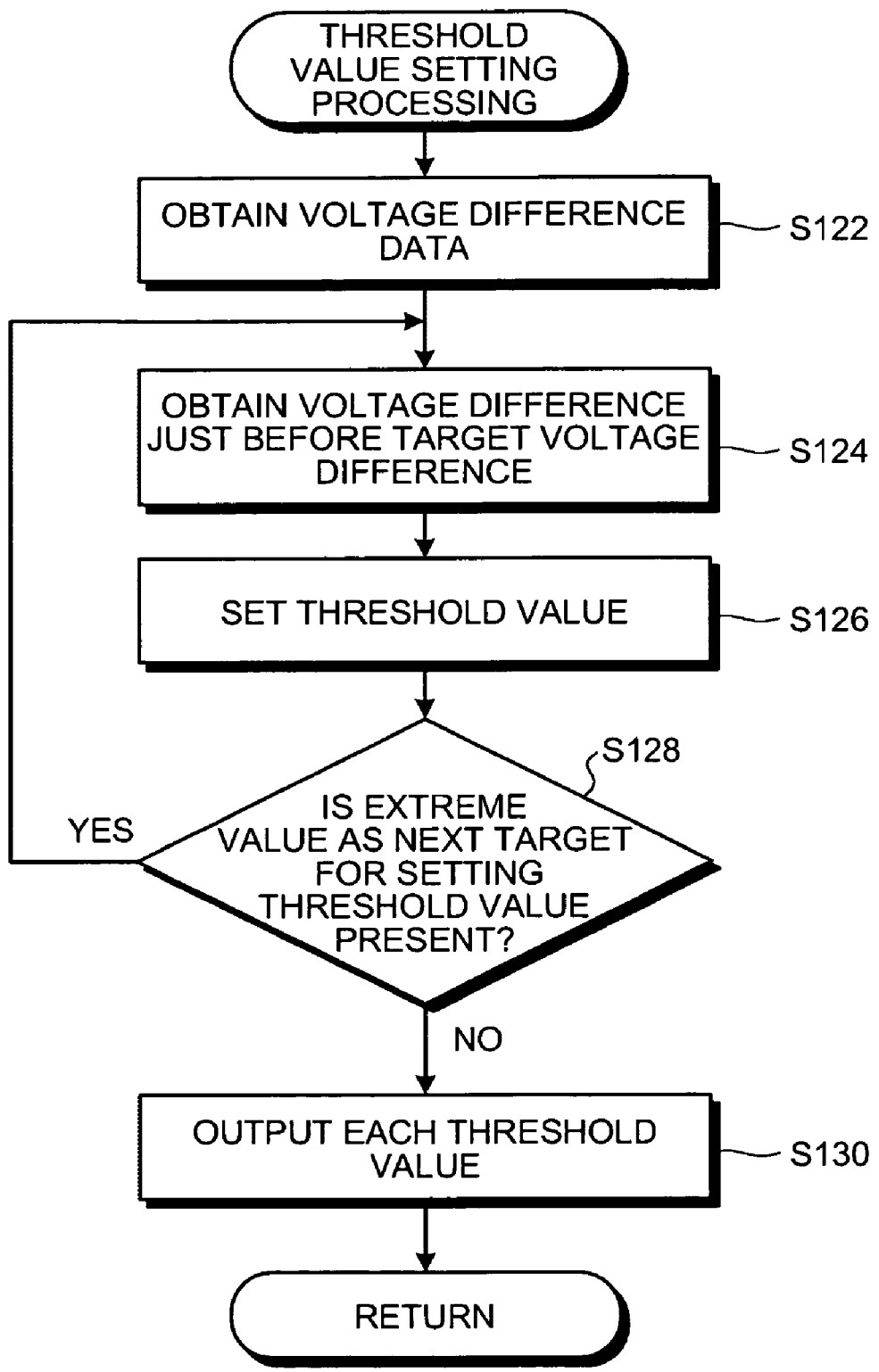
FIG. 16 is a flow chart of another procedure of the threshold value setting processing shown in FIG. 2.

As a threshold value setting processing in this case, the threshold value setting unit 17 obtains voltage difference data as shown in FIG. 16 (step S122), and obtains a voltage difference value just before the voltage difference corresponding to the extreme value as the target for setting the threshold value (step S124). Next, the threshold value setting unit 17 sets a threshold value for an extreme value as the target for setting the threshold value based on the obtained voltage difference value (step S126). For example, as a value enabling a discrimination between an extreme value caused by a noise and a proper extreme value, the threshold value setting unit 17 sets a value which is 60% to 70% of the voltage difference value just before the target voltage difference as a threshold value of the extreme value as a target for setting the threshold value. The threshold value setting unit 17 determines whether an extreme value as a next target for setting the threshold value is present or not (step S128). When it is determined that an extreme value as the next target for setting the threshold is present ("Yes" at step S128), the threshold value setting unit 17 returns to step S124 and performs the processing of setting a threshold value for the next extreme value. When it is determined that an extreme value as the next target for setting the threshold is not present ("No" step S128), the threshold value setting unit 17 associates set threshold value with each extreme value, outputs to the extreme value verifying unit 18 (step S130), and ends the threshold value setting processing.

In the embodiment, the case where the extreme value verifying unit 18 verifies the validity of an extreme value as a verification target by comparing a voltage difference between the target extreme value and an extreme value just before the target extreme value with the threshold value is explained. However, the present invention is not limited to this, and the extreme value verifying unit 18 may verify the validity an extreme value as the verification target by comparing a voltage difference between the target extreme value and an extreme value just after the target extreme value with the threshold value.

Figure 17:
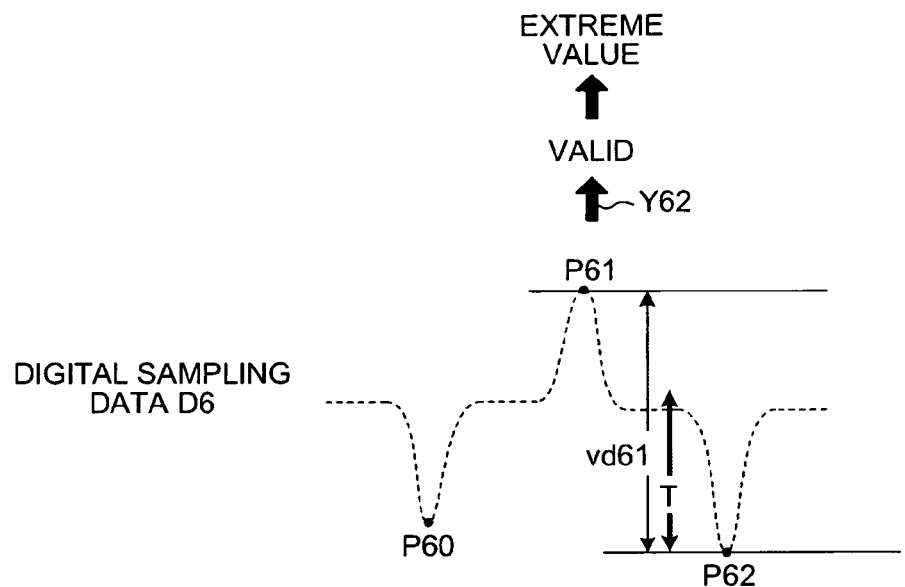
FIG. 17 is an explanatory view of another example of the extreme value verifying processing in the extreme value verifying unit shown in FIG. 1.

Specifically in a case of taking digital sampling data D6 shown in FIG. 17 as an example, when determining the validity with respect to an extreme value P61, the extreme value verifying unit 18 uses a voltage difference vd61 between the extreme value P61 and an extreme value P62 just after the extreme value P61, and compares the voltage difference vd61 with the threshold value T. In this case, since the voltage difference vd61 is not less than the threshold value T, the extreme value verifying unit 18 determines that the extreme value P61 should be valid as shown by an arrow Y62. Further, the extreme value verifying unit 18 may determine the validity of an extreme value by using a voltage difference with an extreme value just before the target extreme value or with an extreme value just after the target extreme value, depending on the extreme value as the verification target. For example, when determining the validity of a first extreme value in the differential signal, the extreme value verifying unit 18 uses a voltage difference between the first extreme value and an extreme value just after the first extreme value to determine the validity of the first extreme value since no extreme value before the first extreme value is present. Furthermore, when determining the validity of a last extreme value in the differential signal, the extreme value verifying unit 18 uses a voltage difference between the last extreme value and an extreme value just before the last extreme value to determine the validity of the last extreme value since no extreme value after the last extreme value is present. In this way, it is possible to determine the validity of the first extreme value and the last extreme value in the differential signal.

In addition, the extreme value verifying unit 18 may use voltage differences respectively with extreme values just before and after a target extreme value to determine that only an extreme value whose voltage differences with both extreme values before and after the target extreme value are not less than the threshold value should be valid, thereby enhancing the certainty in determining the validity of an extreme value.

Figure 18:
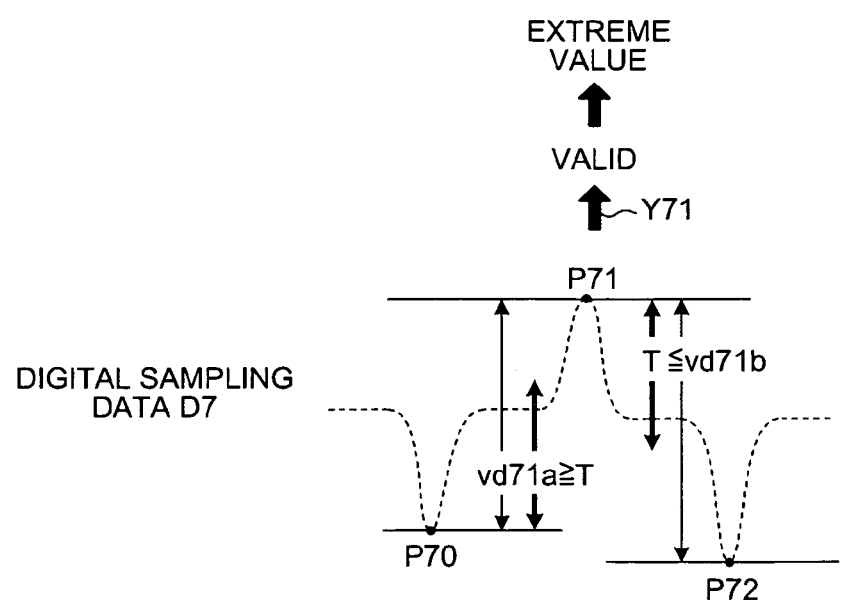
FIG. 18 is an explanatory view of still another example of the extreme value verifying processing in the extreme value verifying unit shown in FIG. 1.
Figure 19:
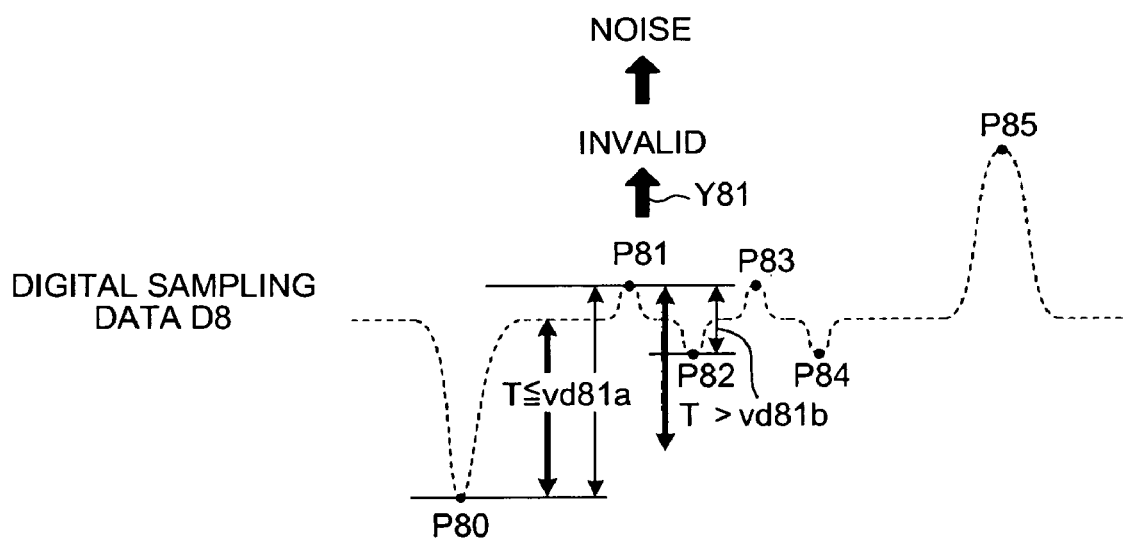
FIG. 19 is an explanatory view of still another example of the extreme value verifying processing in the extreme value verifying unit shown in FIG. 1.
Figure 20:
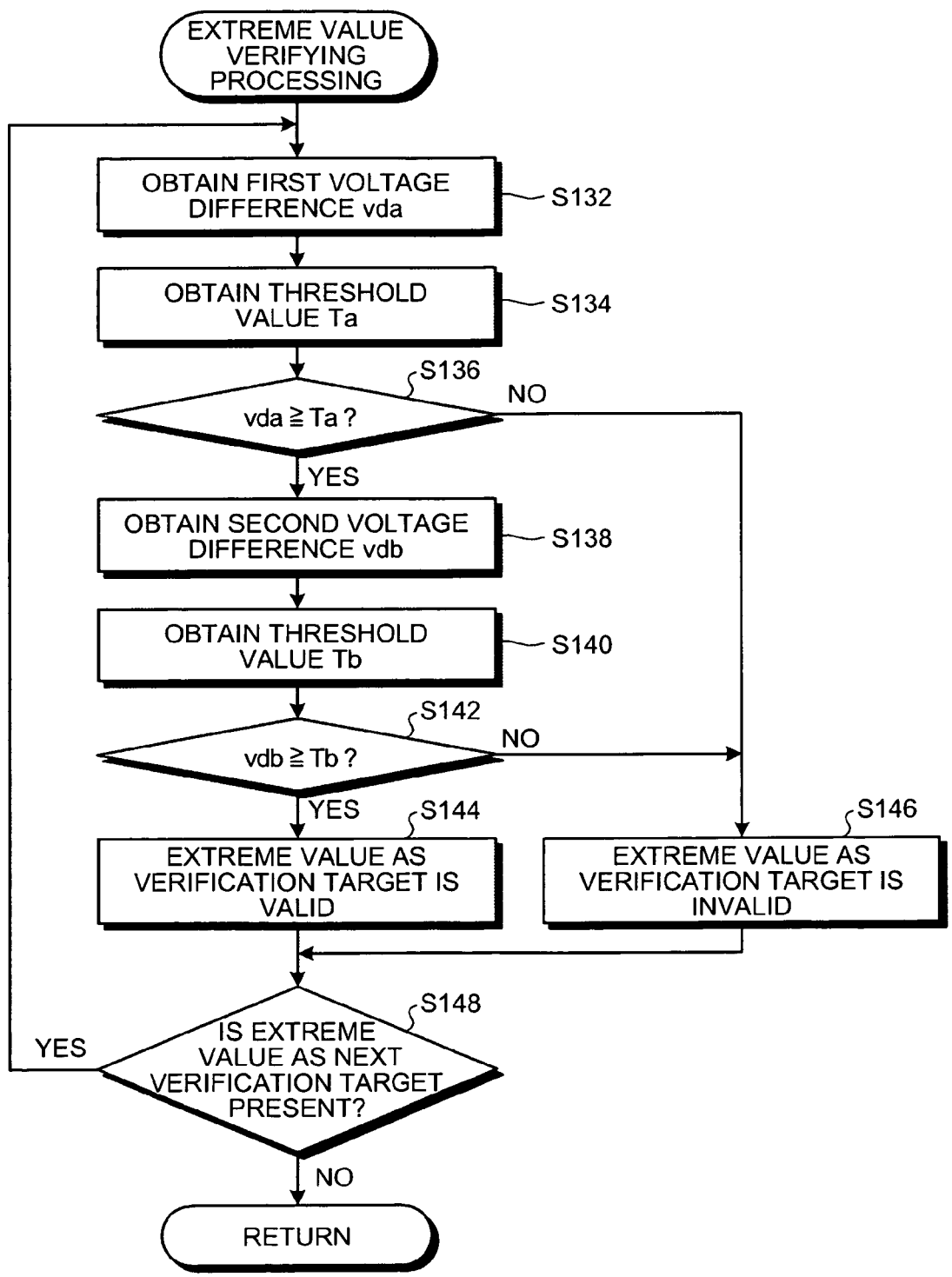
FIG. 20 is a flow chart of another procedure of the extreme value verifying processing shown in FIG. 2.

Specifically in the case of taking digital sampling data D7 shown in FIG. 18 as an example and determining the validity with respect to an extreme value P71, the extreme value verifying unit 18 compares both of a voltage difference vd71a and a voltage difference vd71b with the threshold value T, the voltage difference vd71a being calculated between the extreme value P71 and an extreme value P70 just before the extreme value P71, and the voltage difference vd71b being calculated between the extreme value P71 and an extreme value P72 just after the extreme value P71. In this case, since both of the voltage differences vd71a and vd71b are not less than the threshold value T, the extreme value verifying unit 18 determines that the extreme value P71 should be valid as shown by an arrow Y71. In contrast, in a case of taking digital sampling data D8 shown in FIG. 19 as an example and determining the validity with respect to an extreme value P81, the extreme value verifying unit 18 determines that the extreme value P81 should be invalid as shown by an arrow Y81 since a voltage difference vd81b between the extreme value P81 and an extreme value P82 just after the extreme value P81 is less than the threshold value T even though a voltage difference vd81a between the extreme value P81 and an extreme value P80 just before the extreme value P81 is not less than the threshold value T. Since voltage differences between an extreme value at an end of the noise and each of extreme values before and after the noise-end extreme value both are not to be not less than the threshold value, it is possible for the extreme value verifying unit 18 to eliminate a whole noise in a single extreme value verifying processing by determining that only the extreme value whose voltage differences with extreme values before and after the target extreme value are not less than the threshold value should be valid.

As the extreme value verifying processing in this case, the extreme value verifying unit 18 obtains a voltage difference between an extreme value as the verification target and one of extreme values adjacent to the target extreme value as a first voltage difference vda (step S132), and obtains a threshold value Ta corresponding to the one of the extreme values adjacent to the target extreme value (step S134). Then, the extreme value verifying unit 18 compares the first voltage difference vda with the threshold value Ta to determine whether vda≧Ta is true or not (step S136). When it is determined that vda≧Ta is not true ("No" at step S136), the extreme value verifying unit 18 determines that the target extreme value should be invalid (step S146).

On the other hand, when it is determined that vda≧Ta is true ("Yes" at step S136), the extreme value verifying unit 18 obtains a voltage difference between the target extreme value and the other one of the extreme values adjacent to the target extreme value as a second voltage difference vdb (step S138), and obtains a threshold value Tb corresponding to the other one of the extreme values adjacent to the target extreme value (step S140). The extreme value verifying unit 18 compares the second voltage difference vdb with the threshold value Tb to determine whether vdb≧Tb is true or not (step S142). When it is determined that vdb≧Tb is not true ("No" at step S142), the extreme value verifying unit 18 determines that the target extreme value should be invalid (step S146). On the other hand, when it is determined that vdb≧Tb is true ("Yes" at step S142), the extreme value verifying unit 18 determines that the target extreme value should be valid (step S144), and then determines whether another extreme value as a next verification target is present or not (step S148). When it is determined that another extreme value as the next verification target is present ("Yes" at step S148), the extreme value verifying unit 18 returns to step S132 and performs the verifying processing on the extreme value as the next verification target. On the other hand, when it is determined that no extreme value as the next verification target is not present ("No" at step S148), the extreme value verifying unit 18 determines that the verification of all extreme values in the extreme value data is completed, and ends the extreme value verifying processing.

In the bar-code reading apparatus 1, the case where the extreme value detector 14 performs the A/D conversion with respect to the differential signal is explained. However, the present invention is not limited to this, and the differential processor 13 may perform the differential processing after the A/D conversion of a voltage signal as a differential target and generate the differential signal. Furthermore, the differential processor 13 or the extreme value detector 14 may perform amplification and filtering with respect to the signal after the A/D conversion.

Figure 21:
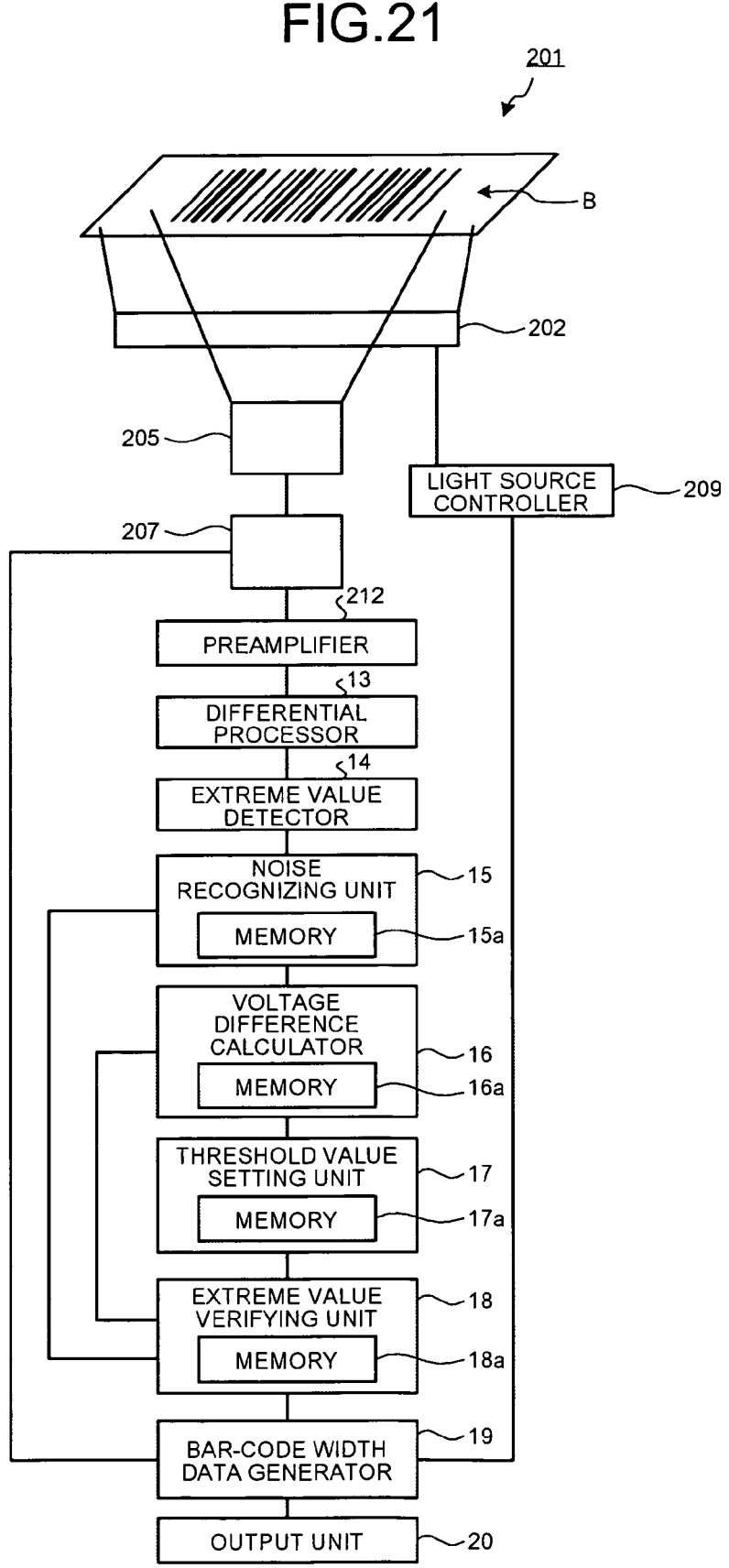
FIG. 21 is a view showing another structure of the bar-code reading apparatus according to the embodiment.

In the embodiment, the bar-code reading apparatus 1 which emits a scanning light to the bar code B and reads the bar code B is explained. However, the present invention is not limited to this, and a bar-code reading apparatus 201 which captures an image of the bar code B to read the bar code B may be employed as shown in FIG. 21. As shown in FIG. 21, the bar-code reading apparatus 201 includes a light source 202 which irradiates the entirety of the bar code B with light, a light focusing unit 205 which focuses light reflected from the entirety of the bar code B, an imaging element 207 which is formed by a charge coupled diode (CCD) and the like, receives the light focused by the light focusing unit 205, and converts the received light into an electric signal corresponding to an intensity of the received light, a preamplifier 212 which amplifies the electric signal output from the imaging element 207 and outputs to the differential processor 13, and a light source controller 209 which controls a light emitting processing of the light source 202, in place of the reflection mirror 3, the scanning mirror 4, the light collecting mirror 5, the optical filter 6, the sensor 7, and the shield 8 in the bar-code reading apparatus 1 shown in FIG. 1. The electric signal output from the preamplifier 212 is associated with width information of each element in the bar code B and a voltage value according to the intensity of the received light.

In the bar-code reading apparatus 201, the light source 202, the imaging element 207, and the light source controller 209 perform an imaging processing, in which the bar code B is irradiated with light, the light reflected from the entirety of the bar code B is received, and an electric signal corresponding to the entirety of the bar code B is generated as shown in FIG. 22 (step S202). The preamplifier 212 performs an amplifying processing, in which the electric signal output from the imaging element 207 are amplified (step S204). In the bar-code reading apparatus 201, a differential processing (step S208), an extreme value detecting processing (step S210), a noise recognizing processing (step S212), a voltage difference calculating processing (step S214), a threshold value setting processing (step S216), an extreme value verifying processing (step S218), a processing of determining the presence of an extreme value determined to be invalid (step S220), a processing of eliminating an invalid extreme value (step S222), an extreme value data re-inputting processing (step S224), an extreme value data outputting processing (step S226), a bar-code width data generating processing (step S228), a decoding processing (step S230), and an outputting processing (step S232) are performed similarly to the procedure of steps S2 to S32 shown in FIG. 2. Thus, it is possible to accurately read the bar code B since bar code width data is generated after determining the validity of an extreme value based on a voltage difference even in the bar-code reading apparatus 201 which captures an image of the bar code B and reads the bar code B.

In the embodiment, the bar-code reading apparatus 1 including the scanning mirror capable of a bidirectional scanning is explained. However, the present invention is not limited to this, and a bar-code reading apparatus having a pen shape which is used by an operator to scan the irradiation area of a scanning light is also applicable.

As described above, since the present invention uses a voltage difference with an extreme value adjacent to an extreme value as a verification target to determine the validity of the extreme value as the verification target, a bar code can be read accurately even when a differential signal tilts because of an undulation of the differential signal caused by an outside light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A bar-code reading apparatus, comprising:
    a differential processor which generates a differential signal from an electric signal corresponding to an intensity of light reflected from a bar code;
    an extreme value detector which detects an extreme value in the differential signal generated by the differential processor, and generates extreme value information including at least an electric signal value of the detected extreme value;
    a calculating unit configured to calculate, for each extreme value in the extreme value information, a difference value between the electric signal value of the extreme value and an electric value of at least one of extreme values adjacent to the extreme value;
    a determining unit which compares the difference value with a predetermined threshold value and determines a validity of the extreme value corresponding to the difference value, for each difference value calculated by the calculating unit; and
    a decoding processor which decodes information encoded as the bar code by using the extreme value information of the extreme value which is determined to be valid by the determining unit.

2. The bar-code reading apparatus according to claim 1, wherein when the difference value is not less than the predetermined threshold value, the determining unit determines that the extreme value corresponding to the difference value should be a valid extreme value corresponding to the bar code.

3. The bar-code reading apparatus according to claim 1, wherein when the difference value is less than the predetermined threshold value, the determining unit determines that the extreme value corresponding to the difference value should be an invalid extreme value not corresponding to the bar code, and eliminates the extreme value determined to be invalid from the extreme value information.

4. The bar-code reading apparatus according to claim 1, further comprising a recognizing unit which
    calculates, when successive rising extreme values are present in the extreme value information, a difference value between an electric signal of the rising extreme value and an electric signal of a falling extreme value adjacent to the rising extreme value for each of the successive rising extreme values and then recognizes the rising extreme value corresponding to a maximum difference value among the calculated difference values as a valid rising extreme value corresponding to the bar code, and
    calculates, when successive falling extreme values are present in the extreme value information, a difference value between an electric signal of the falling extreme value and an electric signal of a rising extreme value adjacent to the falling extreme value for each of the successive falling extreme values and then recognizes the falling extreme value corresponding to a maximum difference value among the calculated difference values as a valid falling extreme value corresponding to the bar code.

5. The bar-code reading apparatus according to claim 4, wherein
the recognizing unit determines that the extreme value corresponding to the difference value except for the maximum difference value among the calculated difference values should be an invalid extreme value not corresponding to the bar code, and outputs to the calculating unit the extreme value information in which the extreme value determined to be invalid is eliminated, and
the calculating unit calculates the difference value for each extreme value based on the extreme value information output by the recognizing unit.

6. The bar-code reading apparatus according to claim 1, wherein the predetermined threshold value is set based on a maximum amplitude of the differential signal.

7. The bar-code reading apparatus according to claim 1, wherein the predetermined threshold value is set based on a maximum difference value among the difference values calculated by the calculating unit.

8. The bar-code reading apparatus according to claim 1, wherein the predetermined threshold value is set, for each extreme value, based on the difference value corresponding to another extreme value adjacent to the extreme value.

9. The bar-code reading apparatus according to claim 1, further comprising:
a light source which emits light;
a scanning unit which makes the light emitted from the light source traverse the bar code;
a light focusing unit which focuses the light reflected from the bar code; and
a detector which sequentially receives the light focused by the light focusing unit, sequentially converts the received light into an electric signal corresponding to an intensity of the received light, and outputs the converted electric signal to the differential processor.

10. The bar-code reading apparatus according to claim 1, further comprising:
a light source which irradiates an entirety of the bar code with light;
a light focusing unit which focuses the light reflected from the entirety of the bar code; and
a detector which receives the light focused by the light focusing unit, converts the received light into an electric signal corresponding to an intensity of the received light, and outputs the converted electric signal to the differential processor.

11. A bar-code reading method in which a bar code is irradiated with light and read based on an intensity of light reflected from the bar code, comprising:
generating a differential signal from an electric signal corresponding to the intensity of the light reflected from the bar code;
generating, after detecting an extreme value in the differential signal, extreme value information including at least an electric signal value of the detected extreme value;
calculating, for each extreme value in the extreme value information, a difference value between the electric signal value of the extreme value and an electric signal value of at least one of extreme values adjacent to the extreme value;
determining a validity of the extreme value corresponding to the difference value, for each difference value calculated in the calculating by comparing the difference value with a predetermined threshold value; and
decoding information encoded as the bar code by using the extreme value information of the extreme value which is determined to be valid in the determining.

12. The bar-code reading method according to claim 11, wherein when the difference value is not less than the predetermined threshold value, the extreme value corresponding to the difference value is determined to be a valid extreme value corresponding to the bar code in the determining.

13. The bar-code reading method according to claim 11, wherein when the difference value is less than the predetermined threshold value, the extreme value corresponding to the difference value is determined to be an invalid extreme value not corresponding to the bar code, and the extreme value determined to be invalid is eliminated from the extreme value information in the determining.

14. The bar-code reading method according to claim 11, further comprising:
recognizing, when successive rising extreme values are present in the extreme value information, after calculating a difference value between an electric signal of the rising extreme value and an electric signal of a falling extreme value adjacent to the rising extreme value for each of the successive rising extreme values, the rising extreme value corresponding to a maximum difference value among the calculated difference values as a valid rising extreme value corresponding to the bar code; and
recognizing, when successive falling extreme values are present in the extreme value information, after calculating a difference value between an electric signal of the falling extreme value and an electric signal of a rising extreme value adjacent to the falling extreme value for each of the successive falling extreme values, the falling extreme value corresponding to a maximum difference value among the calculated difference values as a valid falling extreme value corresponding to the bar code.

15. The bar-code reading method according to claim 14, wherein
the extreme value corresponding to the difference value except for the maximum difference value among the calculated difference values is determined to be an invalid extreme value not corresponding to the bar code, and the extreme value information in which the extreme value determined to be invalid is eliminated is output in the recognizing, and
the difference value for each extreme value is calculated in the calculating based on the extreme value information output in the recognizing.

16. The bar-code reading method according to claim 11, wherein the predetermined threshold value is set based on a maximum amplitude of the differential signal.

17. The bar-code reading method according to claim 11, wherein the predetermined threshold value is set based on a maximum difference value among the difference values calculated in the calculating.

18. The bar-code reading method according to claim 11, wherein the predetermined threshold value is set, for each extreme value, based on the difference value corresponding to another extreme value adjacent to the extreme value.

* * * * *